(12) United States Patent
Bao et al.

(10) Patent No.: US 8,233,544 B2
(45) Date of Patent: Jul. 31, 2012

(54) VIDEO CODING WITH FINE GRANULARITY SCALABILITY USING CYCLE-ALIGNED FRAGMENTS

(75) Inventors: Yiliang Bao, San Diego, CA (US); Narendranath Malayath, San Diego, CA (US); Sharath Manjunath, San Diego, CA (US); Yan Ye, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1418 days.

(21) Appl. No.: 11/776,679

(22) Filed: Jul. 12, 2007

(65) Prior Publication Data
US 2008/0013622 A1   Jan. 17, 2008

Related U.S. Application Data

(60) Provisional application No. 60/830,891, filed on Jul. 13, 2006, provisional application No. 60/866,999, filed on Nov. 22, 2006, provisional application No. 60/917,542, filed on May 11, 2007.

(51) Int. Cl.
*H04N 7/12* (2006.01)
*H04N 11/02* (2006.01)

(52) U.S. Cl. ............... 375/240.18; 375/240.1

(58) Field of Classification Search .......... None
See application file for complete search history.

(56) References Cited

U.S. PATENT DOCUMENTS

| | | | |
|---|---|---|---|
| 2003/0118097 A1 | 6/2003 | Chen et al. | |
| 2003/0118099 A1 | 6/2003 | Comer et al. | |
| 2003/0118113 A1 | 6/2003 | Comer et al. | |
| 2004/0001635 A1 | 1/2004 | Van Der Schaar | |
| 2005/0196057 A1 | 9/2005 | Suh | |
| 2007/0110165 A1* | 5/2007 | Park et al. | 375/240.24 |
| 2007/0116120 A1* | 5/2007 | Park et al. | 375/240.12 |

(Continued)

FOREIGN PATENT DOCUMENTS

KR    20050090302 A    9/2005

(Continued)

OTHER PUBLICATIONS

Amon, Peter et al, High-Level Syntax for SVC, Joint Video Team (JVT) of ISO/IEC MPEG & ITU-T VCEG (ISO/IEC JTC1/SC29/WG11 ITU-T SG16 Q.6) 16th Meeting: Poznan, Jul. 24-29, 2005.

(Continued)

*Primary Examiner* — Christopher Revak
(74) *Attorney, Agent, or Firm* — Matthew J. Evans; Brent A. Boyd

(57) ABSTRACT

The disclosure describes FGS video coding techniques that use cycle-aligned fragments (CAFs). The techniques may perform cycle-based coding of FGS video data block coefficients and syntax elements, and encapsulate cycles in fragments for transmission. The fragments may be cycle-aligned such that a start of a payload of each of the fragments substantially coincides with a start of one of the cycles. In this manner, cycles can be readily accessed via individual fragments. Some cycles may be controlled with a vector mode to scan to a predefined position within a block before moving to another block. In this manner, the number of cycles can be reduced, reducing the number of fragments and associated overhead. The CAFs may be entropy coded independently of one another so that each fragment may be readily accessed and decoded without waiting for decoding of other fragments. Independent entropy coding may permit parallel decoding and simultaneous processing of fragments.

68 Claims, 12 Drawing Sheets

U.S. PATENT DOCUMENTS

| | | | |
|---|---|---|---|
| 2007/0160133 A1* | 7/2007 | Bao et al. | 375/240.1 |
| 2007/0201550 A1* | 8/2007 | Wang et al. | 375/240.1 |
| 2007/0201561 A1* | 8/2007 | Park et al. | 375/240.24 |
| 2008/0013633 A1* | 1/2008 | Ye et al. | 375/240.24 |
| 2008/0089425 A1* | 4/2008 | Karczewicz | 375/240.23 |
| 2009/0219988 A1* | 9/2009 | Cammas et al. | 375/240.01 |
| 2010/0322529 A1* | 12/2010 | Amonou et al. | 382/233 |

FOREIGN PATENT DOCUMENTS

| | | |
|---|---|---|
| KR | 100954816 | 4/2010 |
| RU | 2201654 | 3/2003 |
| RU | 2284671 | 9/2006 |
| RU | 2294058 | 2/2007 |
| WO | WO2005032138 | 4/2005 |
| WO | WO2006135885 | 12/2006 |

OTHER PUBLICATIONS

Han, J., et al.: "Variable Block-Size Transform and Entropy Coding at the Enhancement Layer of FGS," 2004 IEEE, Downloaded on Oct. 11, 2009 pp. 481-484.

Written Opinion—PCT/US2007/073354, International Search Authority, European Patent Office, Jun. 6, 2008.

International Preliminary Report on Patentability—PCT/US07/073354, The International Bureau of WIPO—Geneva, Switzerland, Jan. 13, 2009.

International search Report—PCT/US07/073354—International Search Authority, European Patent Office, Jun. 6, 2008.

Bao, Y, et al., "FGS Block Enhancements for Scalable Video Coding" Video Standards and Drafts, XX, XX, No. M11428, Oct. 14, 2004.

Bao, Y, et al., "FGS Complexity Reduction" Video Standards and Drafts, No. JVT-T087, Jul. 15-21, 2006.

Ridge, J, et al., "Cyclical Block Coding for FGS" Video Standards and Drafts, XX, XX, No. M11509, Jan. 13, 2005.

Ridge, J, et al., "Fine-Grained Scalability for H.264/AVC" Signal Processing and its Applications, 2005. Proceedings of the Eighth International Symposium on Sydney, Australia, Aug. 28-31, 2005, Piscataway, NJ, USA, IEEE, vol. 1, pp. 247-250.

Wiegand, Thomas, et al., Joint Draft 6: Scalabale Video Coding,: JVT-S 201, Joint Video Team (JVT) of ISO/IEC MPEG and ITU-T VCEG, Apr. 2006, Geneva.

Wiegand, Thomas, et al., "Joint Draft 9 of SVC Amendment," JVT-V 201, Joint Video Team (JVT) of ISO/IEC MPEG and ITU-T VCEG, Jan. 2007, Marrakech.

TIA—1099: "Forward Link Only Air Interface Specification for Terrestrial Mobile Multimedia Multicast".

* cited by examiner

NORMAL FRAGMENT

CYCLE-ALIGNED FRAGMENT

US 8,233,544 B2

VIDEO CODING WITH FINE GRANULARITY SCALABILITY USING CYCLE-ALIGNED FRAGMENTS

This application claims the benefit of U.S. Provisional Application No. 60/830,891, filed Jul. 13, 2006, U.S. Provisional Application No. 60/866,999, filed Nov. 22, 2006, and U.S. Provisional Application No. 60/917,542, filed May 11, 2007, the entire content of each of which is incorporated herein by reference.

TECHNICAL FIELD

This disclosure relates to video coding and, more particularly, scalable coding of digital video.

BACKGROUND

Digital video capabilities can be incorporated into a wide range of devices, including digital televisions, digital direct broadcast systems, wireless communication devices, personal digital assistants (PDAs), laptop computers, desktop computers, digital cameras, digital recording devices, cellular or satellite radio telephones and the like. Digital video devices can provide significant improvements over conventional analog video systems in efficiently creating, modifying, transmitting, storing, recording and playing motion video sequences.

Fine granularity scalability (FGS) generally refers to the ability to arbitrarily truncate a video bitstream to achieve graceful degradation of video quality within a given bit rate range. An FGS-encoded video bitstream includes a base layer of a specified quality, and one or more enhancement layers that are linked to the base layer. The enhancement layers include additional data to refine the quality of the base layer. As more of the FGS bitstream is received and decoded, via one or more enhancement layers, the quality of the decoded video improves.

SUMMARY

In general, the disclosure is directed to FGS video coding techniques that make use of cycle-aligned fragments (CAFs). The FGS video coding techniques may perform cycle-based coding of FGS video data block coefficients and syntax elements, and encapsulate the resulting coding cycles in fragments for transmission via network transmission units, such as network abstraction layer (NAL) units. In accordance with this disclosure, the fragments may be cycle-aligned such that a start of each of the fragments substantially coincides with a start of one of the cycles. In this manner, coding cycles can be readily accessed via individual fragments.

Each of the cycles may represent at least a portion of a zigzag order scan of one or more blocks of transform coefficients. At least some of the cycles may span coding coefficients associated with a plurality of blocks. The FGS video data blocks may form part of an FGS slice of video data. In some aspects, the FGS slice may be a progressive refinement (PR) slice, although the disclosure is not limited in that regard. At least some of the cycles may be controlled with a vector mode command to scan to a predefined scan position within each of the blocks before moving to another one of the blocks. In this manner, the number of cycles necessary to traverse the blocks can be reduced, resulting in a reduced number of fragments and reduced overhead.

The fragments may be entropy coded independently of one another using separate coding contexts so that multiple fragments may be simultaneously decoded. The entropy coding used for each of the fragments may be reset before entropy coding the next fragment such that each of the fragments is entropy coded independently of the other fragments. For example, an entropy coder may be flushed and coding contexts used by the entropy coder may be reset after each of the fragments is entropy coded. Independent entropy coding of the fragments may permit parallel decoding and independent processing of different fragments and the cycles within the fragments such that multiple fragments may be decoded simultaneously if necessary.

In one aspect, the disclosure provides a video coding method comprising encoding fine granularity scalability (FGS) video data blocks in cycles, and encapsulating the cycles in a plurality of fragments such that a start of each of the fragments substantially coincides with a start of one of the cycles.

In another aspect, the disclosure provides a video encoder comprising a cycle-based coding module that encodes fine granularity scalability (FGS) video data blocks in cycles, and a fragmentation module that encapsulates the cycles in a plurality of fragments such that a start of each of the fragments substantially coincides with a start of one of the cycles.

In an additional aspect, the disclosure provides a video decoding method comprising receiving fragments including coding cycles that encode fine granularity scalability (FGS) video data blocks, and decoding at least portions of at least some of the fragments simultaneously, wherein a start of each of the fragments substantially coincides with a start of one of the cycles.

In a further aspect, the disclosure provides a video decoder comprising a cycle-based decoding module that receives fragments including coding cycles that encode fine granularity scalability (FGS) video data blocks, and decodes at least portions of at least some of the fragments simultaneously, wherein a start of each of the fragments substantially coincides with a start of one of the cycles.

The techniques described in this disclosure may be implemented in a hardware, software, firmware, or any combination thereof. If implemented in software, the software may be executed in one or more processors, such as a microprocessor or digital signal processor (DSP). The software that executes the techniques may be initially stored in a computer-readable medium and loaded and executed in the processor. Accordingly, this disclosure also contemplates a computer-readable medium comprising instructions to perform techniques as described in this disclosure.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
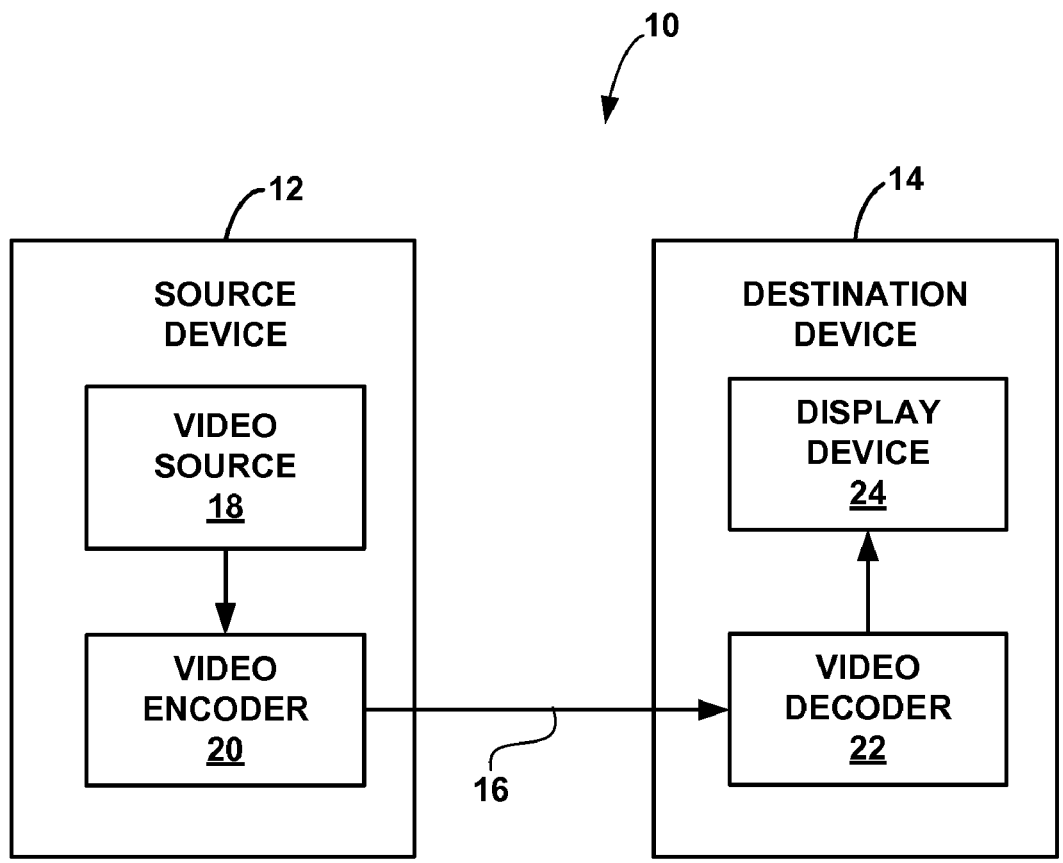
FIG. 1 is a block diagram illustrating a video encoding and decoding system.

In general, the disclosure is directed to FGS video coding techniques that make use of cycle-aligned fragments (CAFs). The FGS video coding techniques may perform cycle-based coding of FGS video data block coefficients and syntax elements, and encapsulate the resulting coding cycles in fragments for transmission via network transmission units, such as network abstraction layer (NAL) units. In accordance with this disclosure, the fragments may be cycle-aligned such that a start of each of the fragments substantially coincides with a start of one of the cycles. In this manner, coding cycles can be readily accessed via individual fragments.

Each of the cycles may represent at least a portion of a zigzag order scan of one or more blocks of transform coefficients. At least some of the cycles may span coding coefficients associated with a plurality of blocks. The FGS video data blocks may form part of an FGS slice of video data. In some aspects, the FGS slice may be a progressive refinement (PR) slice, although the techniques described in this disclosure are not necessarily limited to PR slices. At least some of the cycles may be controlled with a vector mode command to scan to a predefined scan position within each of the blocks before moving to another one of the blocks. In this manner, the number of cycles necessary to traverse the blocks can be reduced, resulting in a reduced number of fragments and reduced overhead.

The fragments may be entropy coded in such a way that a fragment may be decoded without the completion of the decoding of other fragments. In some cases, multiple fragments may be decoded simultaneously, if necessary. As an example, the entropy coding used for each of the fragments may be reset before entropy encoding the next fragment such that each of the fragments has entropy coding contexts that are independent of the entropy coding contexts of the other fragments. For example, an entropy coder may be flushed and coding contexts used by the entropy coder may be reset after each of the fragments is entropy coded. Independent entropy coding of the fragments may permit parallel decoding and processing of different fragments and the cycles within the fragments. Accordingly, at least portions of at least some fragments may be decoded simultaneously, e.g., contemporaneously or without waiting for completion of decoding of other fragments.

Some fragments may not be completely independent of each other. For example, if a block A has been completely decoded in a fragment 0, there would be no information to be decoded for block A in other fragments. In this case, decoding the information for block A in a later fragment 1 may be contingent upon the decoding result of fragment 0 for the same block. However, other coding contexts may be kept independent. For example, decoding of fragment 1 does not change whether fragment 0 is completely decoded before fragment 1 is decoded, or fragment 0 and fragment 1 are simultaneously decoded. Accordingly, at least some fragments may be decoded simultaneously with at least portions of other fragments, so that it is not necessary to wait for completion of decoding of other fragments. Instead, as discussed above, at least some fragments may be decoded contemporaneously in parallel with decoding of at least a portion of other fragments, e.g., without waiting for completion of decoding of other fragments.

FIG. 1 is a block diagram illustrating a video encoding and decoding system 10. As shown in FIG. 1, system 10 includes a source device 12 that transmits encoded video to a destination device 14 via a transmission channel 16. Source device 12 may include a video source device 18 and video encoder 20. Destination device 14 may include video decoder 22 and video display device 24. Transmission channel 16 may be a wired or wireless communication medium, or any combination of wired or wireless media. Source device 12 generates video for transmission to destination device 14. In some cases, however, devices 12, 14 may operate in a substantially symmetrical manner. For example, each of devices 12, 14 may include video encoding and decoding components. Hence, system 10 may support one-way or two-way video transmission between video devices 12, 14, e.g., for video streaming, video broadcasting, or video telephony.

Video source 18 may include a video capture device, such as one or more video cameras, a video archive containing previously captured video, or a live video feed from a video content provider. As a further alternative, video source 18 may generate computer graphics-based data as the source video, or a combination of live video and computer-generated video. In each case, the captured, pre-captured or computer-generated video may be encoded by video encoder 20 for transmission from video source device 12 to video destination device 14 via transmission channel 16. Display device 24 may include any of a variety of display devices such as a liquid crystal display (LCD), plasma display or organic light emitting (OLED) diode display.

Video encoder 20 and video decoder 22 may be configured to support fine granularity signal to noise ratio (SNR) scalability (FGS) video coding. For example, encoder 20 and decoder 26 may support various degrees of scalability by supporting encoding, transmission and decoding of scalable enhancement layers in an FGS format. For scalable coding, a base layer carries video data with a minimum level of quality. One or more enhancement layers carry additional bitstream to support higher quality levels. Hence, enhancement layer information may be provided to support signal-to-noise ratio (SNR) scalability. In addition, in some cases, additional bitstream carried by one or more enhancement layers may support increased spatial scalability and/or increased temporal scalability.

Video encoder 20 and video decoder 26 may operate according to a video compression standard, such as MPEG-2, MPEG-4, ITU-T H.263, or ITU-T H.264/MPEG-4 Advanced Video Coding (AVC). More particularly, video encoder 20 and video decoder 26 may be configured to implement extensions of such standards for scalable video coding (SVC). Although not shown in FIG. 1, in some aspects, video encoder 20 and video decoder 22 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to implement low complexity video scalability extensions for devices that otherwise conform to the H.264 standard. For example, video scalability extensions may represent potential modifications for future versions or extensions of the H.264 standard, or other standards. The H.264 standard is described in ITU-T Recommendation H.264, Advanced video coding for generic audiovisual services, by the ITU-T Study Group, and dated March, 2005, which may be referred to herein as the H.264 standard or H.264 specification, or the H.264/AVC standard or standard or specification.

The Joint Video Team (JVT) continues to work on a scalable video coding (SVC) extension to H.264/MPEG-4 AVC. The specification of both H.264/MPEG-4AVC and the evolving SVC extension are in the form of a Joint Draft (JD). The Joint Scalable Video Model (JSVM) created by the JVT implements tools for use in scalable video, which may be used within system 10 for various coding tasks described in this disclosure. Detailed information concerning one example of a Fine Granularity SNR Scalability (FGS) coding system can be found in the Joint Draft documents, and particularly in Joint Draft 6 (JD6), Thomas Wiegand, Gary Sullivan, Julien Reichel, Heiko Schwarz, and Mathias Wien, "Joint Draft 6: Scalable Video Coding," JVT-S 201, Joint Video Team (JVT) of ISO/IEC MPEG and ITU-T VCEG, April 2006, Geneva, and in Joint Draft 9 (SVC JD9), Thomas Wiegand, Gary Sullivan, Julien Reichel, Heiko Schwarz, and Mathias Wien, "Joint Draft 9 of SVC Amendment," JVT-V 201, Joint Video Team (JVT) of ISO/IEC MPEG and ITU-T VCEG, January 2007, Marrakech, Morocco.

Video encoder 20 may be configured to generate FGS slices, e.g., in accordance with the JD documents of the SVC extension to the H.264/MPEG-4 AVC standard. In some aspects, the FGS slices may be progressive refinement (PR) slices. An FGS slice can be almost arbitrarily truncated. As video decoder 22 receives and decodes more bits from the FGS slice, it can produce better video quality. FGS coding in the JSVM has been designed in a way that improvement in video quality is evenly spread out across an entire video frame, as opposed to being concentrated within only a certain spatial area of the frame. The complexity of encoding and decoding an FGS slice can be high in terms of computation and memory requirements. In addition, the decoding process for an FGS slice, as specified in the JD documents, can be complex.

In some aspects, for video broadcasting, this disclosure contemplates application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for the FLO Air Interface. Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, such as a mobile wireless radiotelephone, a video streaming server, or a video broadcast server. However, the techniques described in this disclosure are not limited to any particular type of broadcast, multicast, or point-to-point system.

Video encoder 20 and video decoder 22 each may be implemented as one or more microprocessors, digital signal processors, application specific integrated circuits (ASICs), field programmable gate arrays (FPGAs), discrete logic, software, hardware, firmware or any combinations thereof. Each of video encoder 20 and video decoder 22 may be included in one or more encoders or decoders, either of which may be integrated as part of a combined encoder/decoder (CODEC) in a respective subscriber device, broadcast device, server, or the like. In addition, video source device 12 and video destination device 14 each may include appropriate modulation, demodulation, frequency conversion, filtering, and amplifier components for transmission and reception of encoded video, as applicable, including radio frequency (RF) wireless components and antennas. For ease of illustration, however, such components are not shown in FIG. 1.

A video sequence includes a series of video frames. Video encoder 20 operates on blocks of pixels within individual video frames in order to encode the video data. The video blocks may have fixed or varying sizes, and may differ in size according to a specified coding standard. As an example, the ITU-T H.264 standard supports intra prediction in various block sizes, such as 16 by 16, 8 by 8, 4 by 4 for luma component, and 8×8 for chroma component, as well as inter prediction in various block sizes, such as 16 by 16, 16 by 8, 8 by 16, 8 by 8, 8 by 4, 4 by 8 and 4 by 4 for luma component and corresponding scaled sizes for chroma components. Smaller video blocks can provide better resolution, and may be used for locations of a video frame that include higher levels of detail. After the prediction, a transform may be performed on the 8×8 residual block or 4×4 residual block, and an additional transform may be applied to the DC coefficients of the 4×4 blocks for chroma components or luma components if the intra_16×16 prediction mode is used.

Figure 2:
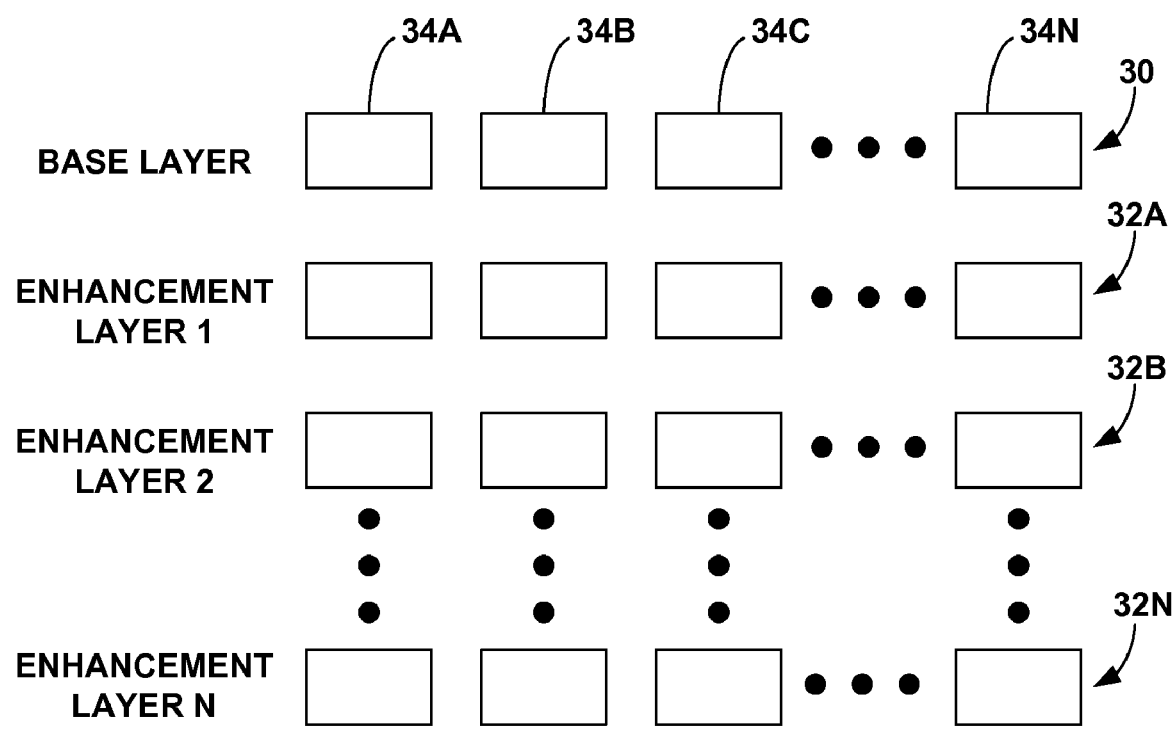
FIG. 2 is a diagram illustrating multi-layer FGS encoding of a video bitstream.

FIG. 2 is a diagram illustrating multi-layer FGS encoding of a video bitstream. As shown in FIG. 2, FGS encoding of a video bitstream results in a base layer 30 and one or more enhancement layers 32A-32N (collectively layers 32). Base layer 30 includes a series of frames 34A-34N that encode the video bitstream with a minimum level of quality for a given bit rate. Each of enhancement layers 32 provides additional video bitstream information that can be used by a decoder 26 to progressively increase the initial quality provided by base layer 30. The number of enhancement layers 32 processed by video decoder 22 depends on the number of enhancement layers transmitted by source device 12 and received by destination device 14, e.g., given channel conditions or other limitations.

In general, each respective enhancement layer 32A-32N, or portion thereof, that is processed by decoder 22 adds incrementally to the quality of the video obtained from base layer 30, in terms of SNR, in accordance with this disclosure. Enhancement layers 32A-32N also may be exploited for spatial and/or temporal scalability. Instead of processing each enhancement layer 32A-32N in its entirety as a discrete enhancement layer, system 10 may permit scalability enhancement layers to be coded, transmitted and processed using a generalized FGS approach. In this manner, SNR can be scaled with fine granularity, offering continuous quality improvements upon partial decoding of enhancement layers. The enhancement layers 32A-32N may be hierarchical in the sense that the layers offer progressively increasing quality as they are decoded. Decoding of all enhancement layers, for example, will produce maximum quality, while decoding only a first enhancement layer will produce an incremental increase in quality relative to the decoding of only the base layer.

Figure 3:
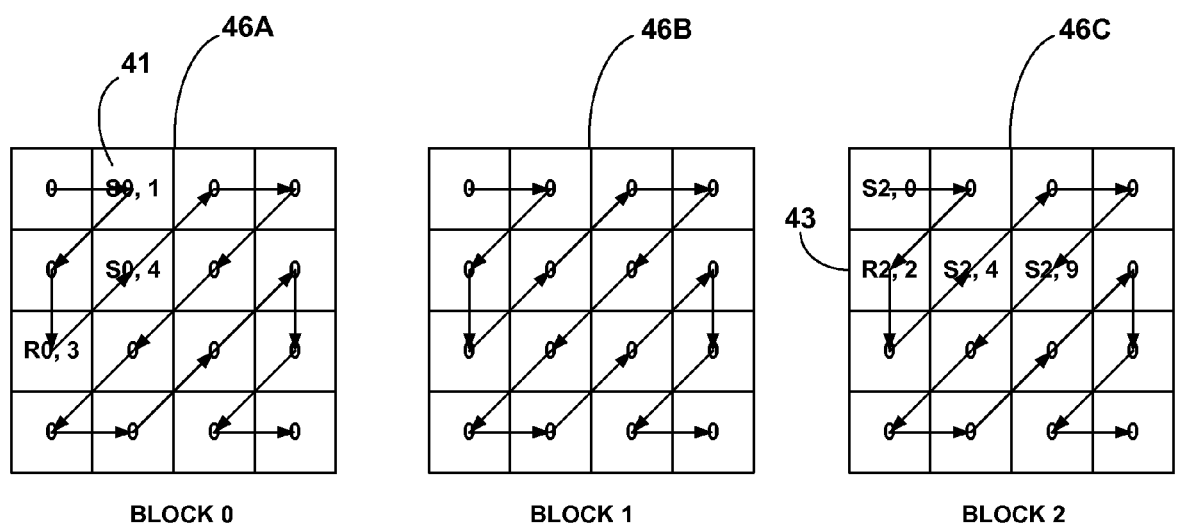
FIG. 3 is a diagram illustrating zigzag scanning of block coefficients for FGS coding of a video frame.
Figure 4:
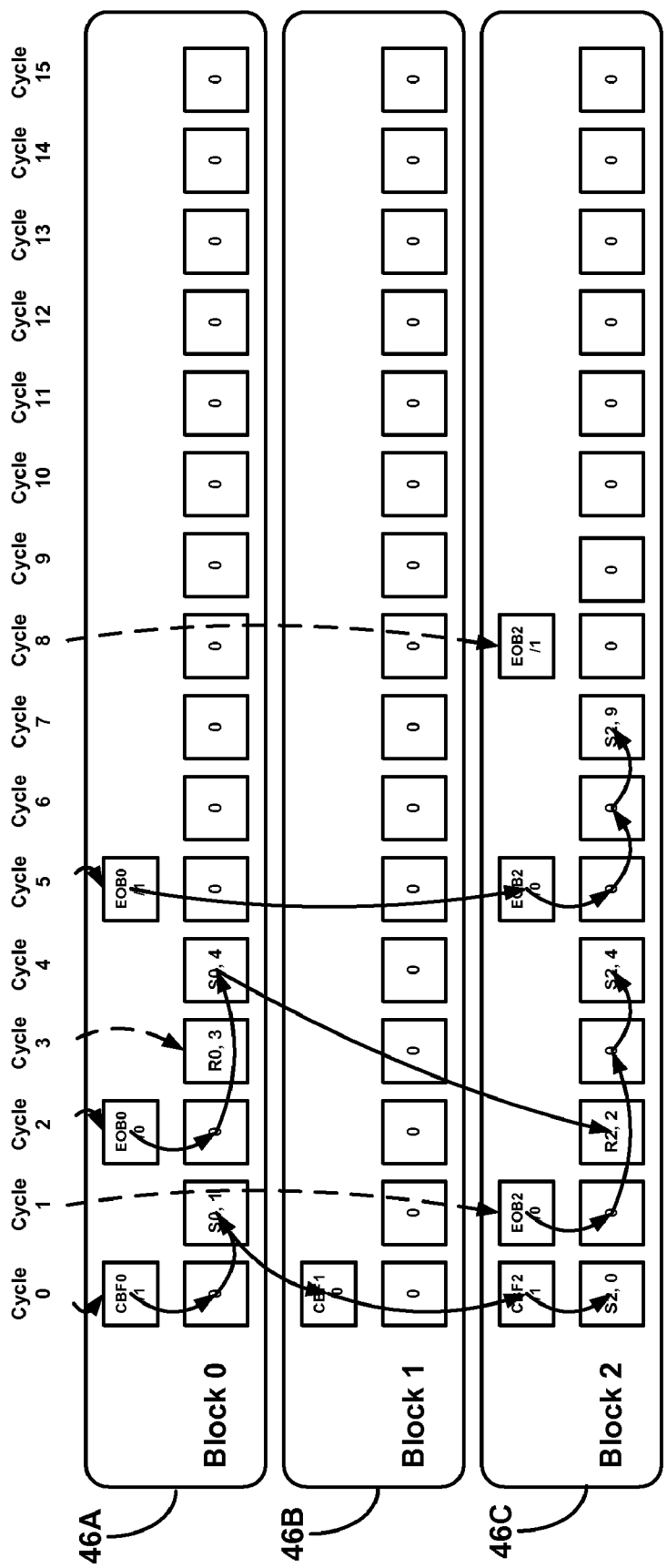
FIG. 4 is a diagram illustrating an example of cycle-based coding of coefficients in an FGS slice for video blocks arranged in zigzag scanning order.

FIG. 3 is a diagram illustrating zigzag scanning of block coefficients in blocks 46A-46C for FGS coding of a video frame. An FGS slice, such as a PR slice, in SVC may be generated using a cycle-based coding instead of a block-based coding of transform coefficients. The cycle-based coding across blocks reduces spatial concentration of SNR enhancements within a video frame. In each cycle, the FGS-configured video encoder 20 encodes at most one nonzero coefficient in a block of transform coefficients and moves to the next block. As shown in FIGS. 3 and 4, in cycle 0, video encoder 20 first encodes a coded block flag (CBF) in the first block 46A, i.e., block 0. If block 0 contains nonzero significant coefficients, video encoder 20 encodes one or more coefficients from the same block until it finishes coding the first significant coefficient in the zigzag scanning order illustrated in FIG. 3. This process continues until all blocks, e.g., within a video frame or portion of a video frame, have been scanned. The, video encoder 20 enters the next coding cycle, cycle 1. If a coefficient at the scanning position of a cycle is a refinement coefficient, video encoder 20 will code only that refinement coefficient and move to the next block.

In the example of FIG. 3, it is assumed that blocks 46A, 46B, and 46C are the first three blocks in an enhancement layer FGS slice of a video frame. In this example, each block 46A, 46B, 46C is represented as a 4-by-4 block of transform coefficients. Blocks 46A, 46B and 46C are depicted in the transform domain. Consequently, each number or variable in a block 46A, 46B, 46C is a quantized coefficient to be coded by a lossless entropy coding process. A coefficient with a label starting with letter "S," e.g., as indicated by reference numeral 41 in block 46A, is a nonzero significant coefficient. Because this block 46A is in an FGS SNR scalability enhancement layer, for each coefficient in a block, there is a corresponding coefficient in the base layer.

For a nonzero significant coefficient, its value is nonzero and its corresponding base layer coefficient is zero. For example, a coefficient "S0, 1" corresponds to a nonzero significant coefficient in block "0" at zigzag scan index "1." A coefficient labeled as "0" is a zero coefficient and its corresponding base layer coefficient is also zero. A coefficient with a label starting with letter "R," e.g., as indicated by reference numeral 43 in block 46A, is a refinement coefficient with a corresponding base layer coefficient that is nonzero, i.e., significant. The value of the refinement coefficient can be either zero or nonzero. For example, a coefficient "R2, 2," as indicated by reference numeral 43, is a refinement coefficient in block "2" at zigzag scan index "2." In classifying the enhancement layer FGS slice coefficients, a significance map is often used. This map indicates the locations of the coefficients that have become significant in the base layer already. The coefficients at these locations in the enhancement layer are refinement coefficients.

Video encoder 20, as described herein, can be seen as providing an extension to an entropy coder used in coding the base layer, e.g., such as the entropy coder contemplated by the ITU-T H.264 standard. In particular, the block partition, transform and quantization used by video encoder 20 in the enhancement layer is similar to those used in the base layer. In order to code the zeros more efficiently, syntax elements such as coded block flag (CBF) and end of block (EOB) can be used. Similar syntax elements are also used in the base layer coding. A CBF is sent once for each block and indicates the presence of a nonzero significant coefficient in the block. If the CBF is 0, there is no nonzero significant coefficient; otherwise, there is at least one nonzero significant coefficient. The EOB flag is used to indicate whether the nonzero significant coefficient just coded is the last nonzero significant coefficient in the scanning order.

One difference between base layer coding and enhancement layer coding by video encoder 20 is in the separation of refinement coefficients from other coefficients in the FGS layer and the coding order. In some aspects, video encoder 20 may include separate base layer encoding and enhancement layer encoding modules. In the base layer, a block is completely coded before the next block is coded, providing block-based coding. For enhancement layer coding, however, coefficients from different blocks are interleaved with one another in cycles, providing cycle-based coding. In each cycle, as discussed above, only some coefficients from a given block are coded. Again, in this manner, video encoder 20 ensures that improvement to video quality is more spatially uniform across a video frame once the bitstream is truncated.

Figure 5:
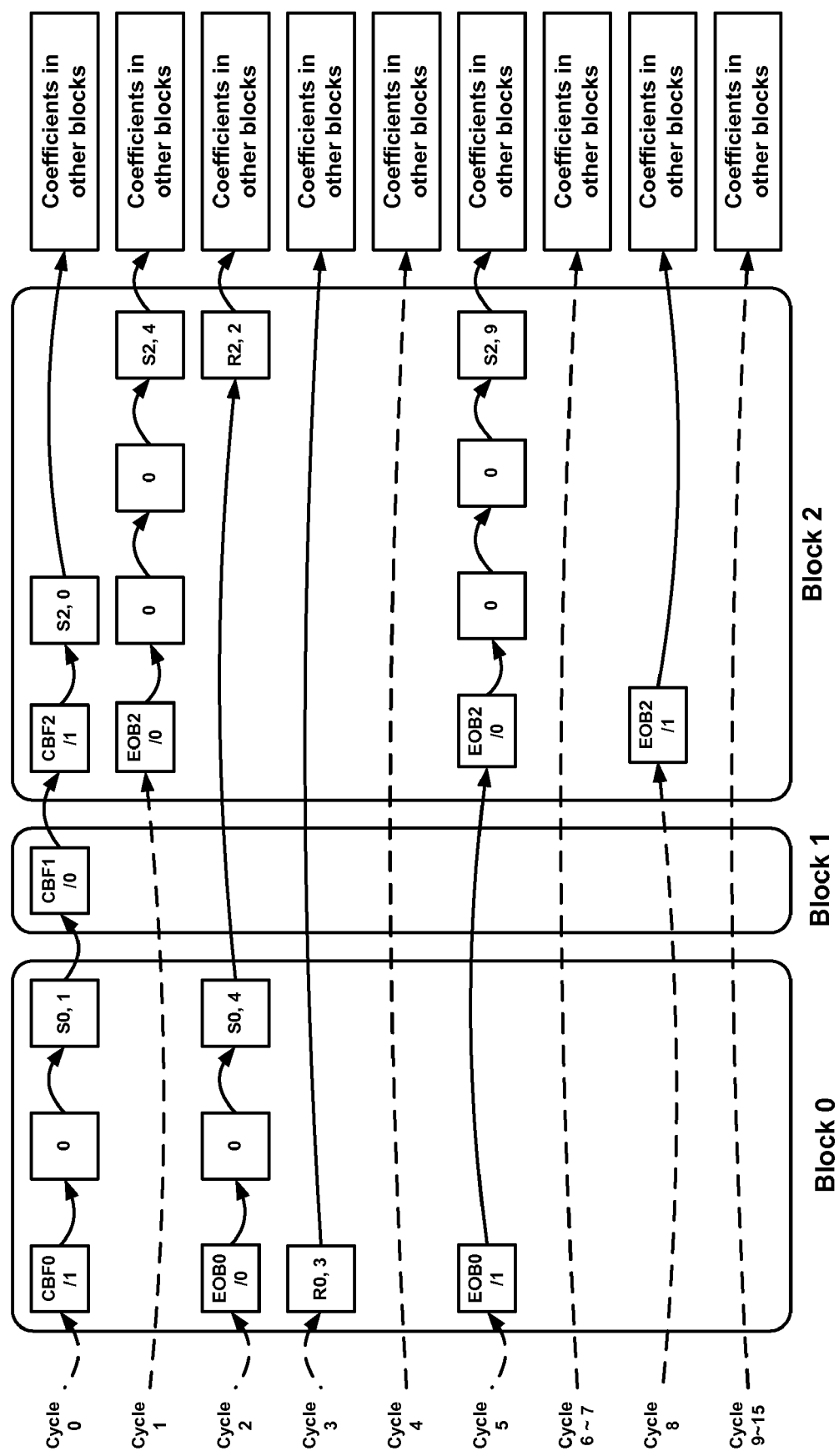
FIG. 5 is a diagram illustrating an example of cycle-based coding of coefficients in an FGS slice for video blocks arranged in order of transmission.

FIG. 4 is a diagram illustrating one example of cycle-based coding of coefficients and syntax elements in an FGS slice for video blocks 46A-46C arranged in zigzag scanning order. In some aspects of this disclosure, the FGS slice may be a PR slice, although the techniques described in this disclosure is not limited to application to PR slices. FIG. 5 is a diagram illustrating cycle-based coding of coefficients and syntax elements in an FGS slice for video blocks arranged in order of transmission. FIG. 5 represents a rearrangement of FIG. 4 so that syntax elements and coefficients coded in a cycle are arranged on the same line. Each coefficient is represented in FIGS. 4 and 5 by a box. In the example of FIGS. 4 and 5, at most one nonzero coefficient is coded for a given block in a single cycle, and the cycle index happens to be the same as the zigzag scan index. In different implementations of FGS, it may not be required that a nonzero coefficient has to be encoded in a cycle. In addition, the refinement coefficients may be treated the same way as the significant coefficients.

As shown in FIG. 4, for cycle 0, a CBF (CBF0, CBF1, CBF2) is sent once for each block 46A, 46B, 46B, and indicates that there is a nonzero significant coefficient in the block. For example, CBF0/1 corresponds to the first block 0, and indicates that there is a nonzero significant coefficient in the block. In addition, a zero coefficient "0" and a nonzero coefficient "S0, 1" from block 0, which corresponds to a nonzero significant coefficient in block "0" at zigzag scan index "1," are sent in cycle 0. CBF1/0, however, corresponds to the second block (block 1) and indicates that there are no nonzero significant coefficients in the block. Hence, there are no coefficients sent for block 1 in subsequent cycles. Cycle 0 further includes CBF2/1, indicating that block 2 includes a nonzero significant coefficient, S2,0, and the coefficient S2,0 itself.

Cycle 1 includes an EOB flag (EOB2/0) for block 2, indicating that the nonzero significant coefficient just coded in cycle 0, which is S2,0, is not the last nonzero significant coefficient in the scanning order. Over the remaining cycles, the coding of blocks continues to follow the scan zigzag order, and includes syntax elements such as CBF and EOB, as appropriate. The process continues for cycles 2-15 in the zigzag scan order, where each cycle corresponds to one arrow transition in FIG. 4. The example of FIGS. 3, 4 and 5 pertain to the first three 4×4 blocks in an enhancement layer of a video frame for purposes of illustration. However, the general scheme illustrated in FIGS. 4-6 may be applicable to blocks with larger sizes as well as larger numbers of blocks spanning a video frame or portion of a video frame.

The complexity of encoding and decoding an FGS slice can be high in terms of computation and memory requirements. In addition, the decoding process for an FGS slice, as specified in the JD document, can be complex. For example, FGS coding of an FGS slice may require a large amount of memory to store intermediate coding state information, such as the position of the last coefficient coded in each block in a previous coding cycle. In addition, FGS coding may require a large amount of memory accesses, as video encoder 20 frequently jumps across blocks during the cycle-based coding process. Storing the coefficients in subband-order may be efficient. In this case, the coefficients of the same frequency band can be stored contiguously. However, storing coefficients in subband-order may be incompatible with the block transform, which may access coefficients of different frequencies.

If the bitstreams from different cycles could be directly accessed, a block could be fully decoded and subsequently processed in a manner similar to the block-based processing in the base layer. Hence, the ability to readily access the bitstreams from different cycles could be helpful in reducing the complexity of FGS slice coding processes. In accordance with an exemplary aspect of this disclosure, video encoder 20 may be configured to perform cycle-based coding of FGS video data block coefficients and encapsulate the resulting coding cycles in fragments for transmission via network transmission units, such as network abstraction layer (NAL) units. To permit ready access to the bitstreams from different cycles, the fragments may be cycle-aligned such that a start of each of the fragments substantially coincides with a start of one of the cycles. In this manner, the bitstreams associated with individual coding cycles can be readily accessed via the fragments.

The Joint Draft of the SVC extension to the H.264/MPEG-4 AVC standard defines a data unit called a "fragment" that contains a partial FGS layer. Fragments may be used as a way to encapsulate the discardable FGS stream. At the encoding side, for example, video encoder 20 may invoke a normal FGS coding process to generate the bitstream of one FGS layer. After the FGS layer bitstream is generated, video encoder 20 may apply bitstream fragmentation. At the decoding side, decoder 22 concatenates adjacent fragments and decodes the merged bitstream as if the bitstream were not fragmented. Hence, processing of one fragment ordinarily requires completion of processing of a previous fragment. In other words, ordinary fragments cannot be decoded simultaneously. Instead, they must be concatenated prior to decoding.

In accordance with this disclosure, fragments may be modified and exploited to provide direct access to portions of the bitstream associated with particular FGS coding cycles. In particular, instead of arbitrarily encapsulating the encoded bitstream in a series of fragments, video encoder 20 controls fragmentation so that fragments are aligned with FGS coding cycles. Alignment may generally refer to formulation of the fragment so that a start of the fragment substantially coincides with a start of one of the cycles. In this manner, the start of a bitstream associated with a cycle can be accessed by identifying the start of the fragment. A fragment may include a header that precedes a payload of the fragment. The header may carry administrative information such as information that identifies a fragment. The payload of the fragment may generally refer to a content portion of the fragment, which may carry coding cycle data, and may be preceded by header information. In accordance with various aspects of this disclosure, cycles may be encapsulated in a plurality of fragments such that a start of each of the fragments substantially coincides with a start of one of the cycles. Hence, substantial coincidence may refer to encapsulation such that a start of a payload of each of the fragments, e.g., following header information, substantially coincides with a start of one of the cycles. In general, with or without regard to header information, the start of each fragment may be substantially aligned with the start of a cycle so that coding cycles can be readily accessed via respective fragments, permitting simultaneous decoding of at least portions of at least some fragments.

A cycle-aligned fragment (CAF) differs from an ordinary fragment in which the start of the fragment may correspond to any unknown point within the bitstream. Instead, the CAF is aligned with the cycle so that the start of the bitstream can be accessed substantially at the start of the fragment. In addition, in some aspects, video encoder 20 may control fragmentation so that each cycle is contained within a single fragment, possibly with other cycles, rather than being spread over portions of successive fragments. Generation of CAFs may reduce processing complexity, and permit parallel processing of successive fragments instead of sequential processing of successive fragments.

To make it possible to decode a cycle-aligned fragment (CAF) without waiting for decoding of a previous fragment to be finished, video encoder 20 may code each CAF without using information that is only available after the previous fragment is decoded. For example, after a first fragment is finished, video decoder 20 may flush the entropy coder used to entropy code the fragment. In addition, video encoder 20 may reset coding contexts associated with entropy coding before the next fragment is coded. By resetting coding contexts and flushing the entropy decoder, video coder 20 generates CAFs that can be readily accessed and decoded without waiting for decoding of other fragments, enabling parallel, simultaneous processing of the CAFs. For example, the decoding may be simultaneous in the sense that decoding of one CAF may be performed contemporaneously with decoding of at least a portion of another CAF. In this manner, a CAF may be decodable without waiting for completion of the decoding of a previous fragment. This is in contrast to normal fragments, which ordinarily would be reassembled prior to decoding.

Video encoder 20 may implement entropy coding as context adaptive variable length coding (CAVLC) or context adaptive binary adaptive coding (CABAC). Compared with an ordinary fragment, a CAF may present some overhead due to the flushing operation and resetting of coding contexts associated with entropy coding. CAVLC is only affected by the flushing operation, which may result in approximately one-half byte in additional overhead on average. For CABAC, CAFs present an additional penalty due to a reset of the coding contexts. Overhead required by additional NAL headers and fragment headers is generally the same for normal fragments and CAFs.

If each cycle is coded as a CAF, the size of the fragment can decrease quickly with the increase in cycle index because the length of each cycle tends to decrease. For this reason, it may be desirable to group some cycles together to reduce overall overhead. In particular, if some cycles are grouped together, the overhead associated with the fragment can be shared among the cycles. If cycles were not grouped together, numerous cycles would be carried in their own fragments, creating fragment overhead for each cycle. In effect, grouping of cycles within a common fragment can be achieved, for example, using a vector mode, e.g., as recently introduced in Joint Draft 6 (JD6) by the JVT.

A vector mode was introduced into JD6 in order to reduce the complexity of the FGS coder. In the vector mode, the FGS coder will process a block in a given cycle until it reaches a preset scanning position before it moves to the next block. In other words, instead of moving to the next block after coding the first significant coefficient, a cycle will continue within a block up to the point that the preset scanning position is reached. With the vector mode, the scan depth of a given cycle within the block is increased. Consequently, the average number of times an FGS coder scans a block can be reduced. The vector mode may define a vector length that determines the number of coefficients to be scanned in a given cycle. If the vector length is 1, the vector mode has no effect, and the FGS coder operates normally. If the vector length is equal to the number of coefficients in a block, the FGS coder degenerates into a normal block-based coder.

The vector mode does not change the fact that the FGS coder visits a block multiple times. However, it can reduce complexity of the cycle-based coding to a certain extent by reducing the number of times the FGS coder visits a block, and reducing the number of coding cycles. When used with cycle-aligned fragments, a modified vector mode can be used to generate fragments of similar sizes, thereby reducing the overhead of fragmentation. Instead of numerous fragments with very small cycle sizes, the vector mode can be used to reduce the number of cycles and increase the depth of each cycle so that the number of fragments needed to accommodate the cycles is reduced. With a reduced number of fragments, there is a reduced number of instances of fragment overhead, resulting in increased efficiency.

In the vector mode described in JD6, the vector lengths are defined in a sequence parameter set. In a modified vector mode, as described in this disclosure, vector lengths can be specified in a slice header rather than the sequence parameter set. Using the vector lengths, video encoder 22 increases the scan depth of individual cycles to code more coefficients in a given cycle, resulting in a reduced number of fragments. As an example, the specific vector lengths may be fixed or adjusted dynamically based on content, channel conditions, processing load, or other factors. The vector lengths may be the same for all cycles, different for selected cycles, or change progressively form the first cycle to the last cycle.

Figure 6:
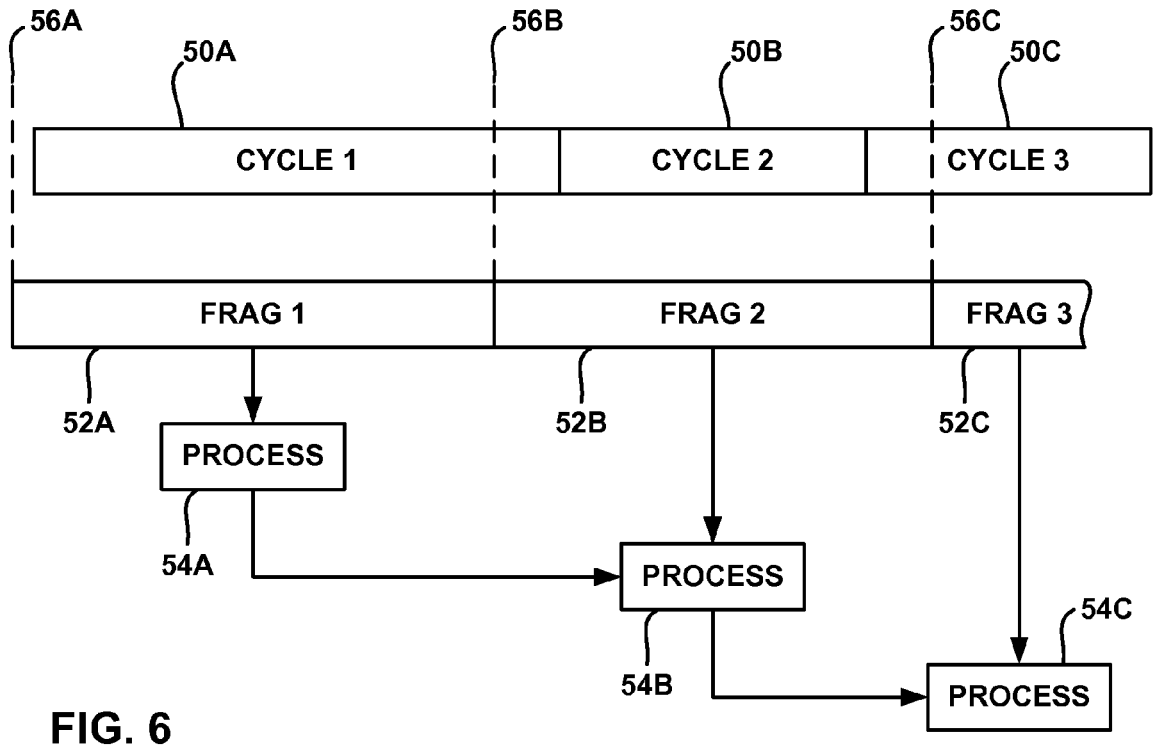
FIG. 6 is a diagram illustrating encapsulation of coding cycles in normal fragments for transmission via network abstraction layer (NAL) units.

FIG. 6 is a diagram illustrating encapsulation of cycles in ordinary fragments for transmission via network abstraction layer (NAL) units. As shown in FIG. 6, the bitstream carried by successive cycles 50A-50C is divided among successive fragments 52A-52C without regard to cycle boundaries. As a result, each given fragment 52 contains a portion of the bitstream associated with one or more cycles 50, and provide no indication as to the start of the bitstream for a given cycle. Rather, different portions of a given cycle 50 may be distributed across the boundaries 56A-56C of successive fragments 52. In addition, each fragment 52 may start at an unknown, generally arbitrary point within the bitstream of a cycle 50, such that cycles cannot be accessed directly via a fragment.

With the bitstream of a cycle 50 spanning successive fragments 52, it is necessary to process successive fragments in a dependent manner. In particular, the arbitrary portions of the bitstream carried by successive fragments 52 are concatenated by video decoder 22 to reproduce the bitstream of the cycles. If first and second fragments 52A and 52B carry portions of CYCLE 1 (50A), for example, both fragments are processed and concatenated to reproduce the bitstream of Cycle 1. To support concatenation, fragment 52A (FRAG 1) must be decoded and processed (54A) before the next fragment 52B (FRAG 2) can be decoded and processed.

Hence, an ordinary fragment 52B cannot be simultaneously decoded and processed. In addition, a later fragment 52B will ordinarily rely on entropy coding of earlier fragments 52A. Consequently, fragment 52B must wait for decoding and processing of the previous fragment 52A to be completed. Therefore, the arrangement of processing operations 54A, 54B, 54C in FIG. 6 represents sequential, dependent decoding and processing of later fragments 52 based on completed processing of previous fragments. Sequential processing of fragments 52, as shown in the example of FIG. 6, can present considerable computational complexity in terms of computing and memory requirements.

Figure 7:
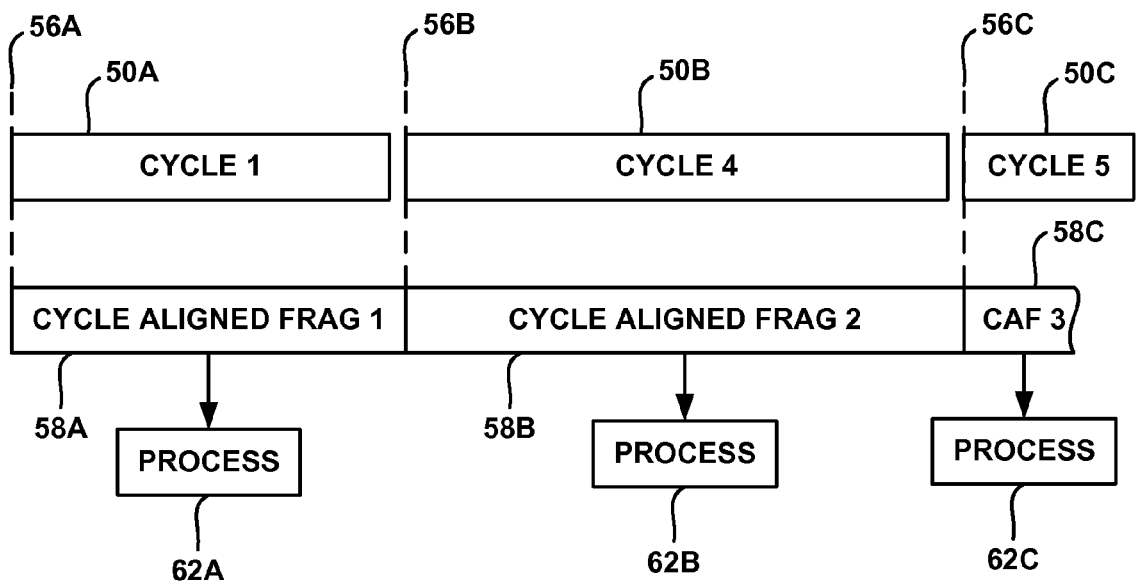
FIG. 7 is a diagram illustrating encapsulation of coding cycles in cycle-aligned fragments (CAFs) for transmission via network abstraction layer (NAL) units.

FIG. 7 is a diagram illustrating encapsulation of cycles in cycle-aligned fragments (CAFs), in accordance with an aspect of this disclosure, for transmission via network abstraction layer (NAL) units. In the example of FIG. 7, video encoder 20 controls fragmentation so that each fragment is a cycle-aligned fragment 58A-58C that starts with the start of a cycle 50A-50E. In addition, as an option, cycles 50 in the example of FIG. 7 may be formulated using a vector mode so that the lengths of at least some of the cycles are extended, reducing the overall number of fragments, and associated overhead, needed to carry the cycles.

In general, each CAF 58 carries a cycle 50 that starts at substantially the start of the CAF. For example, video encoder 20 may encapsulate the cycles in a plurality of CAFs 58 such that a start of each of the fragments, e.g., a start of a payload of each of the fragments, substantially coincides with a start of one of the cycles. In some cases, the start of the payload may be preceded by a header that consumes space within the fragment 58. By substantially aligning the start of a cycle 50 with the start of a fragment 58, the start of the bitstream associated with a cycle 50 can be readily determined, permitting individual cycles to be accessed. Because each CAF 58 carries a cycle 50 that can be directly accessed, there is no need for concatenation of successive fragments to reproduce the bitstream associated with a cycle 50. Instead, video decoder 22 can be configured to simultaneously decode and process fragments 58, e.g., in parallel, as represented by process operations 62A-62C. Again, a fragment 58 may be decoded and processed contemporaneously in parallel with at least a portion of the decoding and processing of one or more other fragments. However, some fragments 58 may still be decoded and processed sequentially.

In order to make a CAF decodable without waiting for the previous fragment to be finished, video encoder 20 may code the CAF without using information that is only available after the previous fragment is decoded. Accordingly, in addition to aligning the cycle start with the fragment start, video encoder 20 may reset coding contexts associated with entropy coding between successively coded fragments. In particular, after the entropy coding for a first fragment is finished, video encoder 20 flushes the CAVLC or CABAC entropy coder, and resets the coding contexts. In this manner, the cycle-aligned fragment does not rely on any coding information from a previously coded fragment, and can be decoded and processed in parallel with other fragments.

Figure 8:
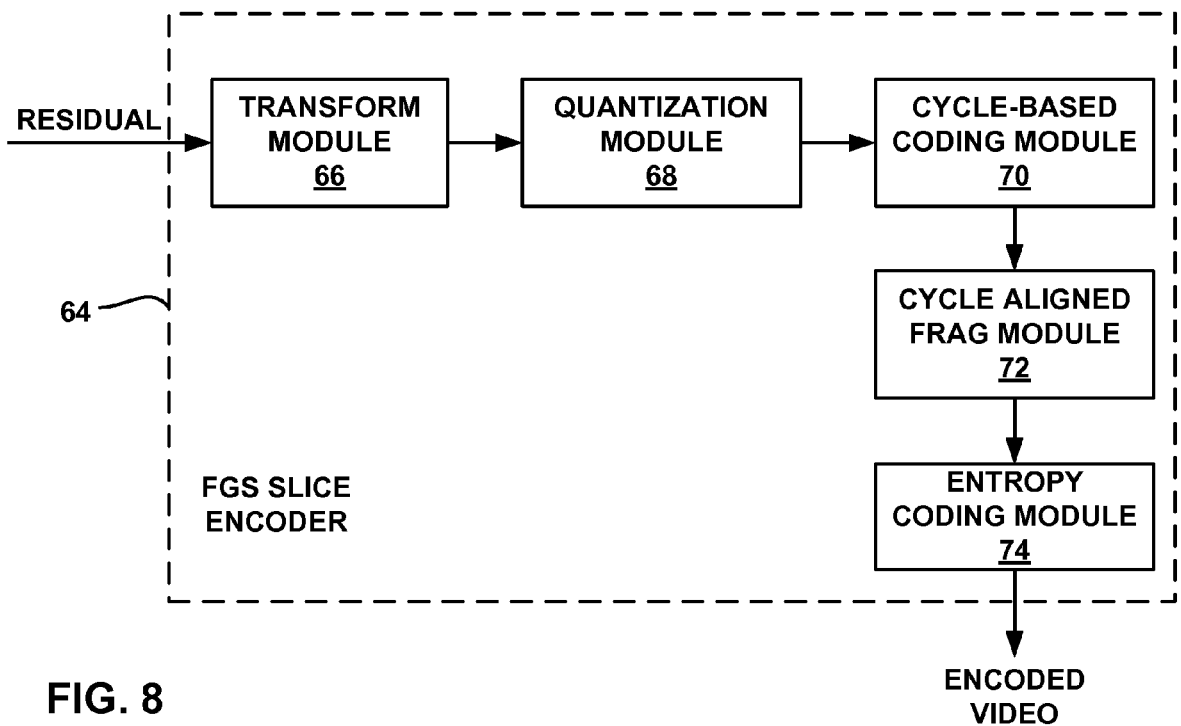
FIG. 8 is a block diagram illustrating an FGS slice encoder that encapsulates coding cycles in CAFs.

FIG. 8 is a block diagram illustrating an FGS slice encoder 64 that encapsulates cycles in cycle-aligned fragments. FGS slice encoder 64 may form part of a digital video encoder, such as video encoder 20 of FIG. 1. As shown in FIG. 8, FGS slice encoder 64 may include a transform module 66, quantization module 68, cycle-based coding module 70, cycle-aligned fragmentation module 72 and entropy coding module 74. Transform module 66 applies a spatial transformation to the source video residual of the FGS slice produced by video encoder 22 to produce blocks of transform coefficients. Quantization module 68 quantizes the resulting transform coefficients. Cycle-based coding module 70 scans the blocks of transform coefficients to produce coding cycles, e.g., in a manner similar to that illustrated in FIGS. 3-5.

Throughout this disclosure, depiction of different features as modules, blocks or components is intended to highlight different functional aspects of video encoder 20 or video decoder 22 and does not necessarily imply that such modules must be realized by separate hardware and/or software components. Rather, functionality associated with one or more modules, such as transform module 66, quantization module 68, cycle-based coding module 70, cycle-aligned fragmentation module 72 and entropy coding module 74, may be integrated within common or separate hardware and/or software components. In some cases, such features may be realized by common or separate software or software modules including code configured to cause a computer to perform the functions attributed to such features.

Cycle-aligned fragmentation module 72 chops the bitstream associated with the coding cycles into fragments. Each fragment encapsulates a cycle such that the start of the cycle bitstream substantially coincides with the start of the payload carried by the fragment. Cycle-aligned fragmentation module 72 may be configured to analyze the bitstream and detect cycle boundaries to trigger cycle-aligned fragmentation. Entropy coding module 74 applies entropy coding, such as CAVLC or CABAC coding, to each of the fragments produced by cycle-aligned fragmentation module 72. Notably, to eliminate interdependence between successive fragments, entropy coding module 74 may flush its prior statistics and reset its coding contexts after each fragment is entropy coded. In this manner, at least some of the successive fragments can be simultaneously decoded and processed. The entropy coded fragments may be placed in network transmission units, such as network abstraction layer (NAL) units, for transmission from source device 12 to destination device 14.

Figure 9:
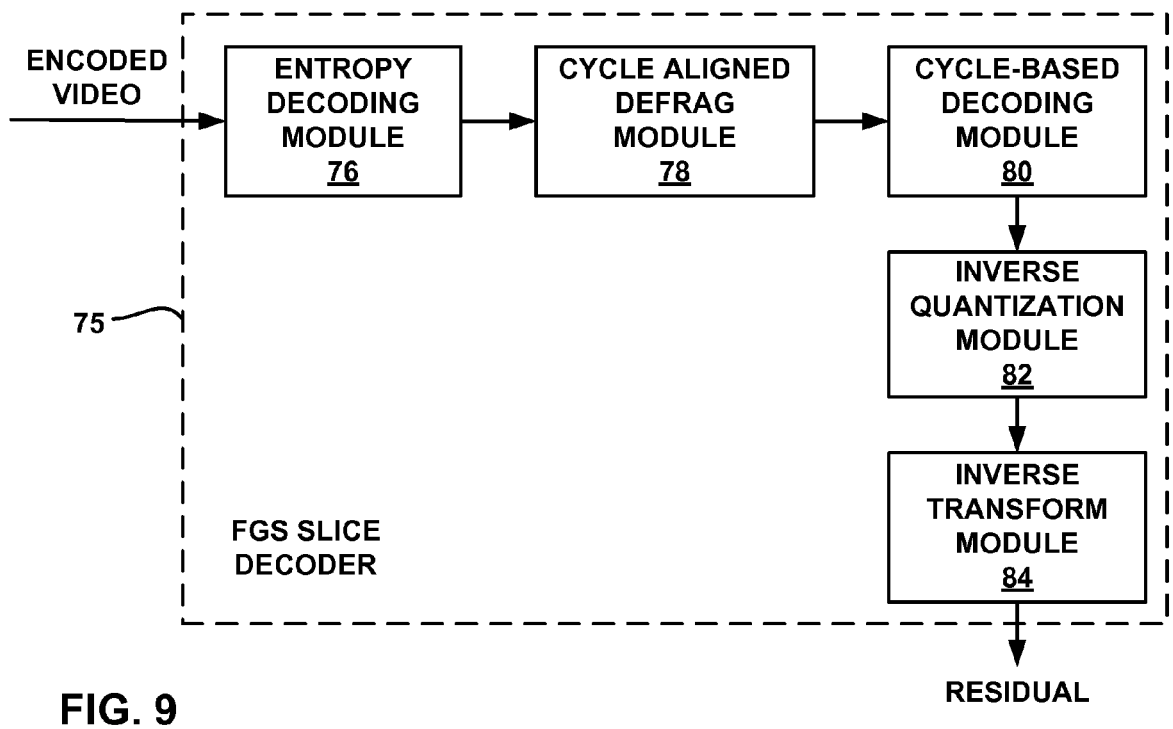
FIG. 9 is a block diagram illustrating an FGS slice decoder that decodes coding cycles encapsulated in CAFs.

FIG. 9 is a block diagram illustrating an FGS slice decoder 75 that decodes cycles encapsulated in cycle-aligned fragments (CAFs). FGS slice decoder 75 may form part of a video decoder, such as video decoder 22 of FIG. 1. As shown in FIG. 9, FGS slice decoder 75 may include entropy decoding module 76, cycle-aligned defragmentation module 80, cycle-based decoding module 80, inverse quantization module 82, and inverse transform module 84. Entropy decoding module 76 applies entropy decoding to the encoded video fragments. Notably, the encoded video CAFs can be entropy decoded in parallel because the CAFs are not coded using the same coding contexts as those in other CAFs, and each CAF provides direct access to the bitstream of a particular cycle.

Cycle-aligned defragmentation module 78 processes the entropy decoded fragments to generate the encoded video bitstream. Cycle-based decoding module 80 scans the video bitstream to produce quantized transform coefficients. Inverse quantization module 82 de-quantizes the transform coefficients. Inverse transform module 84 applies an inverse transform to the dequantized transform coefficients to reproduce the residual. With CAFs, the decoding process for FGS slices can be simplified to be very similar to that of a discrete layer. As an example, in some aspects, the FGS slices may be PR slices. CAFs also can significantly simplify the specification of the syntax of the FGS slice, as described in this disclosure.

Figure 10:
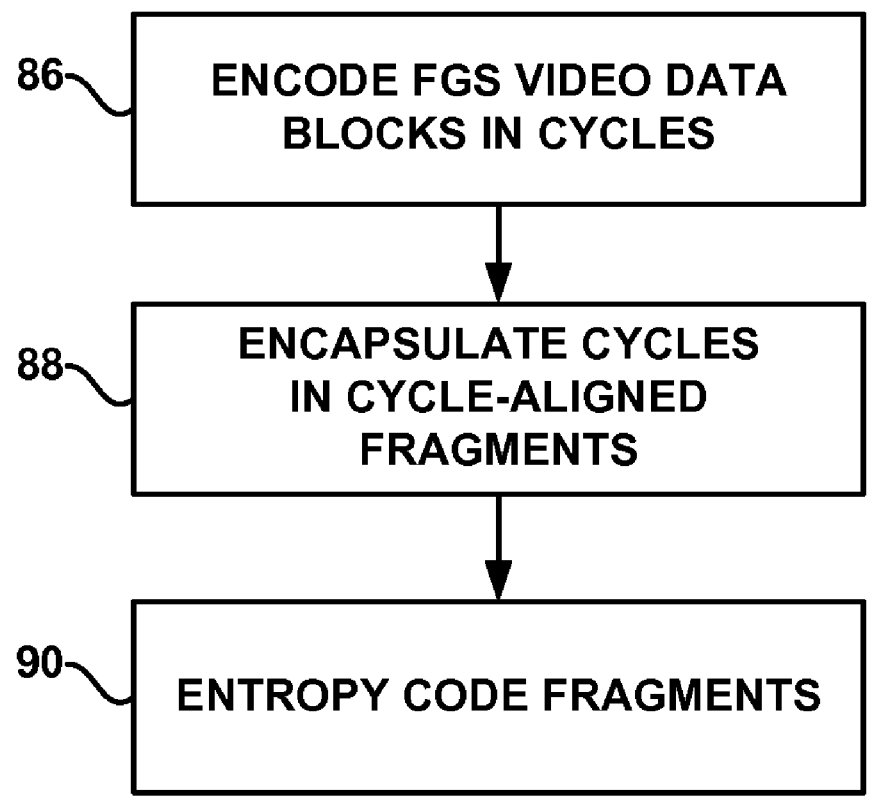
FIG. 10 is a flow diagram illustrating encapsulation of coding cycles in CAFs.

FIG. 10 is a flow diagram illustrating encapsulation of cycles in cycle-aligned fragments (CAFs) as described in this disclosure. Generation of CAFs may be performed within an FGS slice coder associated with video encoder 20, such as FGS slice encoder 64 of FIG. 8. In some aspects, FGS slice encoder 64 may be a PR slice encoder. As shown in FIG. 10, FGS slice encoder 64 encodes FGS video data blocks in cycles (86), encapsulates the cycles in cycle-aligned fragments (88), and entropy codes the fragments (90). As described in this disclosure, the fragments are cycle-aligned in the sense that the start of the bitstream associated with a cycle substantially coincides with the start of the payload of a pertinent fragment used to encapsulate the cycle.

Figure 11:
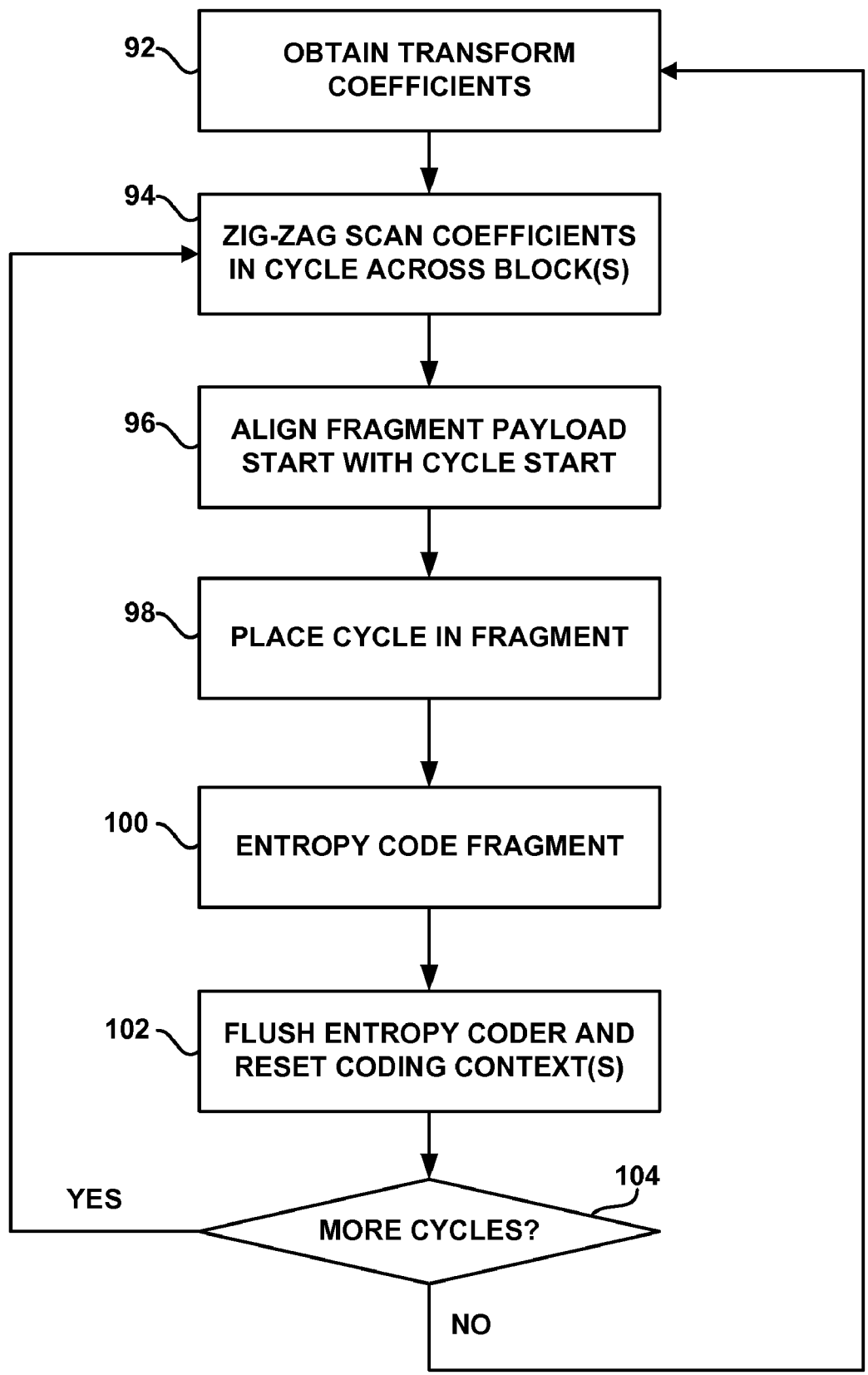
FIG. 11 is a flow diagram illustrating encapsulation of coding cycles in CAFs in greater detail.

FIG. 11 is a flow diagram illustrating encapsulation of cycles in cycle-aligned fragments in greater detail. Again, generation of CAFs may be performed within an FGS slice coder associated with video encoder 20, such as FGS slice encoder 64 of FIG. 8. As shown in FIG. 11, FGS slice encoder 64 obtains transform coefficients for residual video blocks (92), and zig-zag scans the transform coefficients in a cycle across the blocks (94). FGS slice encoder 64 generates a fragment, aligns the start of the fragment payload with the start of the cycle (96), and places the cycle in the fragment (98). FGS slice encoder 64 entropy codes the fragment (100), and then flushes the entropy coder statistics and resets coding contexts (102) associated with entropy coding after the fragment is entropy coded. In this manner, the next fragment to be entropy coded does not require any information that is available only after a previous fragment is completely decoded. Consequently, multiple fragments can be simultaneously decoded in parallel by FGS slice decoder 75, such that the decoding of at least portions of some fragments is at least partially contemporaneous with the decoding of at least portions of one or more other fragments.

If there are more cycles to be coded (104), FGS slice encoder 64 continues the scanning of coefficients across the residual blocks (94) and repeats operations 96, 98, 100, 102. If cycle-based coding is completed, FGS slice encoder 64 obtains transform coefficients for more residual blocks, e.g., from another portion of a video frame or from a subsequent frame, and repeats operations 96, 98, 100, 102. Throughout the process, FGS slice encoder 64 generates CAFs so that the fragments can be simultaneously processed and the bitstream associated with the cycles within the fragments can be directly accessed. Generation of CAFs can result in simplified processing and reduced computing and memory overhead.

Figure 12:
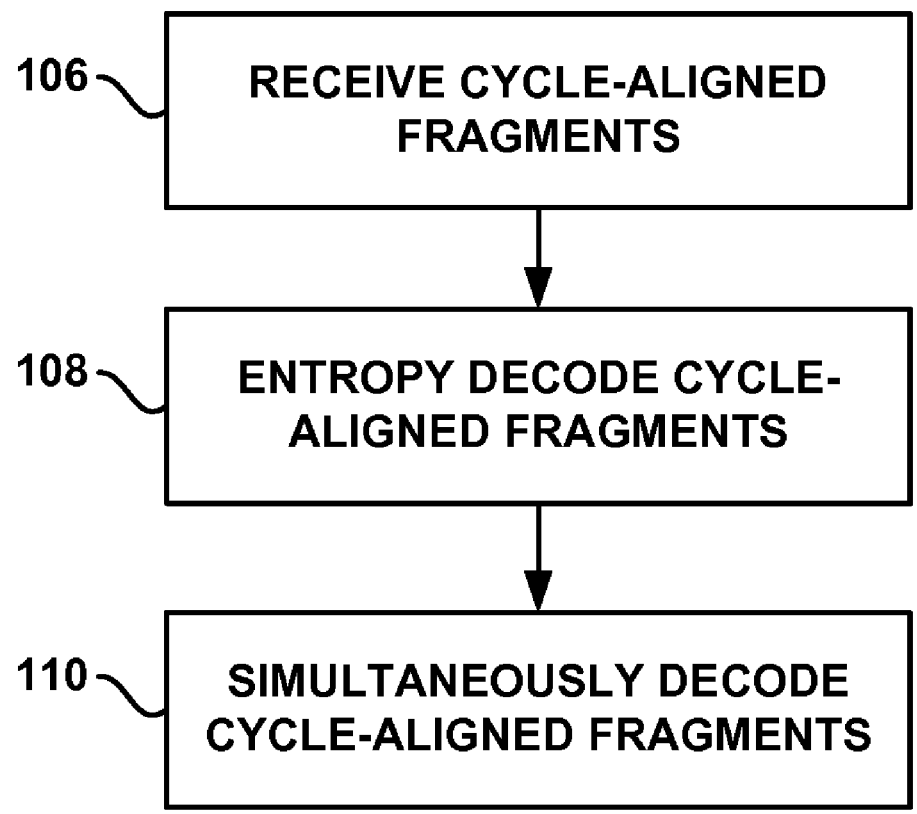
FIG. 12 is a flow diagram illustrating decoding of cycles in CAFs.

FIG. 12 is a flow diagram illustrating decoding of cycles in cycle-aligned fragments (CAFs). Decoding of cycles in CAFs may be performed within an FGS slice decoder associated with video decoder 22, such as FGS slice encoder 75 of FIG. 9. In the example of FIG. 12, FGS slice decoder 75 receives CAFs (106) with incoming video transmitted via channel 16. FGS slice decoder 106 entropy decodes the CAFs (108) and simultaneously decodes at least portions of at least some of the CAFs (110), i.e., without information that is available only after other CAFs are completely decoded. In this manner, FGS slice decoder 75 decodes and processes the CAFs in parallel. Consequently, multiple CAFs can be processed and decoded simultaneously in parallel instead of sequentially. Some CAFs may be completely independent of each other. In other cases, decoding information for a block in a later CAF may be contingent upon decoding of a previous CAF for the same block. In this case, however, other coding contexts for the CAFs can be kept independent such that decoding of a later CAF is the same whether a previous CAF has already been decoded or whether the previous CAF is simultaneously decoded with the later CAF.

Figure 13:
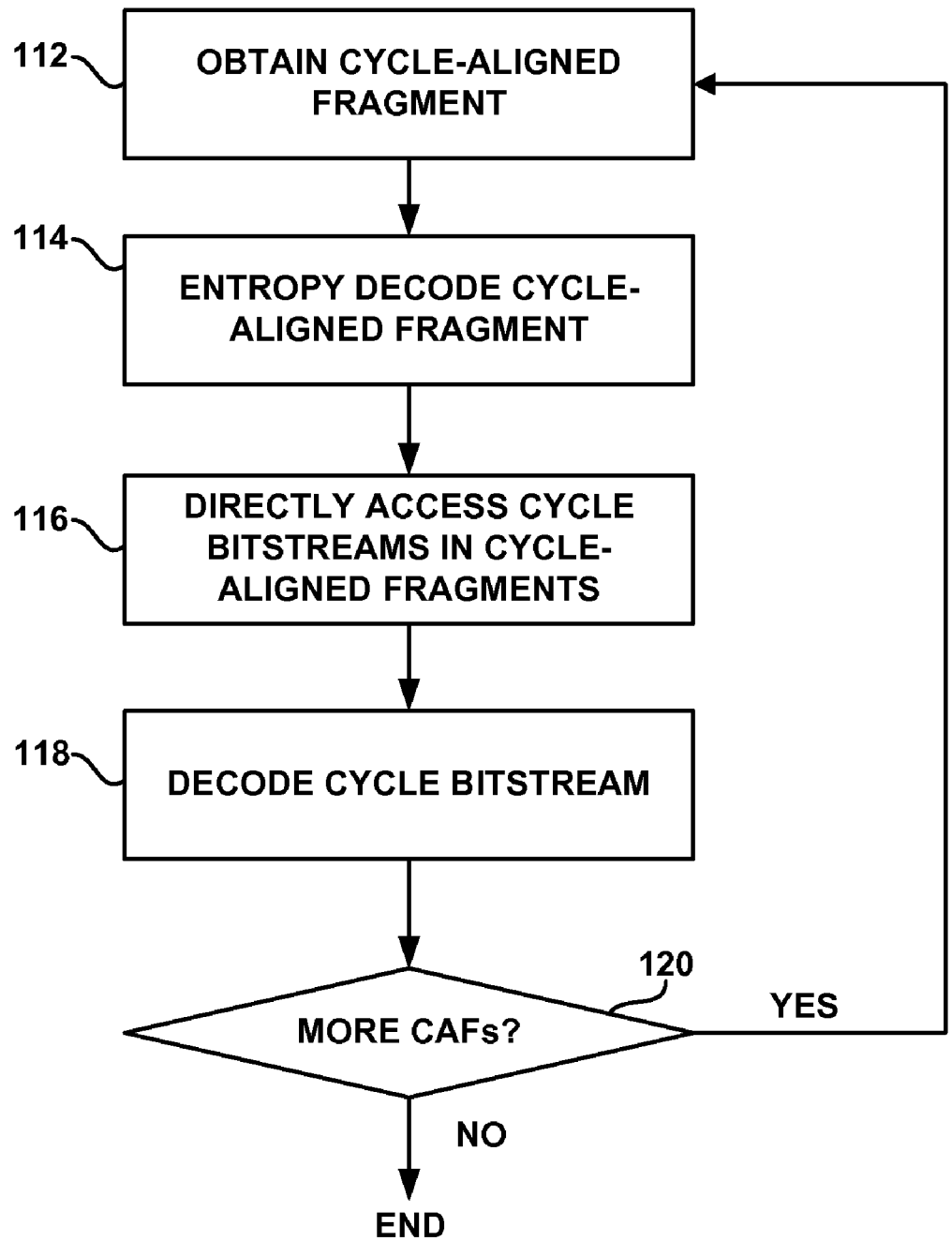
FIG. 13 is a flow diagram illustrating decoding of cycles in CAFs in greater detail.

FIG. 13 is a flow diagram illustrating decoding of cycles in CAFs in greater detail. As shown in FIG. 13, FGS slice decoder 106 may obtain a CAF (112), and entropy decode the CAF (114). FGS slice decoder 75 may directly access the bitstream associated with the cycle carried by the CAF (116), and decode the cycle bitstream (118) to generate the corresponding residual video data. If more CAFs are available (120), FGS slice decoder 75 obtains the next CAF (112) and repeats the operations of FIG. 13, i.e., operations 114, 116, 118.

Figure 14:
FIG. 14 is a diagram illustrating the effects of packet error for normal fragments and CAFs.
Figure 14:
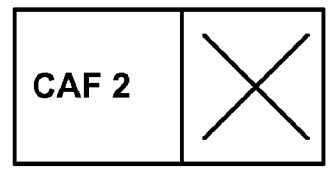
Figure 14:
Figure 14:
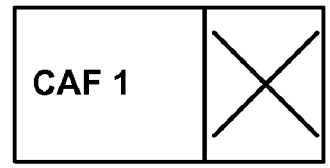
Figure 14:
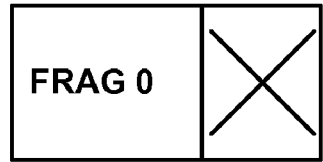
Figure 14:
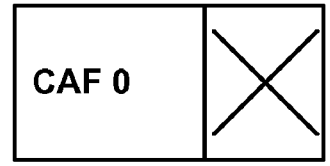

FIG. 14 is a diagram illustrating the effects of packet error for normal fragments and cycle-aligned fragments (CAFs). Usage of CAFs, in accordance with this disclosure, may significantly improve the error resilience of the FGS layer, in addition to simplifying processing and reducing computer and memory requirements. FIG. 14 shows a series of normal fragments (FRAG 0, FRAG 1, FRAG 2) and a series of CAFs (CAF 0, CAF 1, CAF 2). When part of a first normal fragment FRAG 0 is corrupted, as indicated by the X, the corruption renders the subsequent fragments FRAG 1 and FRAG 2, in their entirety, useless. In other words, any amount of corruption in the previously coded FRAG 0 can result in total corruption of the later coded FRAG 1 and FRAG 2. For normal fragments, the previous FRAG 0 and the later fragments FRAG 1 and FRAG 2 are actually generated from the same coding pass. Consequently, the error at the end of normal FRAG 0 corrupts all of the information in FRAG 1 and FRAG 2 because they rely on FRAG 0 for purposes of entropy coding and may contain different portions of a common cycle bitstream.

In contrast, for CAFs, corruption of one fragment will not totally corrupt other fragments. If there is an error at the end of CAF 0, for example, the error will only affect the corresponding parts in CAF 1 and CAF 2. The CAFs may be simultaneously coded and carry bitstreams for separate coding cycles. Consequently, none of the CAFs require information from another CAF for entropy decoding. In addition, loss of information at the end of a coding cycle, e.g., for a particular block of transform coefficients, will only affect subsequent scan information for that block. Accordingly, bitstreams associated with subsequent scans of a set of blocks, other than the corrupted block, will remain intact and can be directly accessed and correctly decoded. hence, the use of CAFs as described in this disclosure may promote error resilience in encoded video.

Additional modifications may be desirable or necessary for the particular FGS coding scheme explained above in order to support CAFs. For example, according to the JD6, a variable "chromaStartCycle" is used to delay the transmission of chroma coefficients with respect to transmission of luma coefficients. In the current implementation in the JSVM, the value of chromaStartCycle is calculated based on statistics collected from a first coding cycle. The FGS slice encoder then sends the resulting chromaStartCycle value at the end of the first coding cycle. If multiple CAFs are simultaneously decoded, it may be desirable to send the chromaStartCycle value in the slice header of the first fragment. Accordingly, video encoder 22 may be further configured to send the chromaStartCycle value in the slice header of the first fragment.

Another possible modification also relates to the transmission of chroma coefficients. In the original JSVM, it is possible that the last chroma AC coding cycle may not overlap with the last luma coding cycle. For this reason, video encoder 22 may be configured to enforce a constraint so that the chroma coefficients are transmitted no later than luma coefficients. In this manner, video encoder 22 can ensure that the last AC coding cycle overlaps with the last luma coding cycle.

As a further refinement, entropy coding may be adjusted in video encoder 22. A context-based VLC coding scheme may be used for entropy coding in generating the FGS bitstream. In order to decouple the CAFs as much as possible, a current scan index may be used for retrieving the VLC parameters. The first iteration may be an exception since there is no symbol corresponding to EOB as in other coding iterations. If the refinement coefficients are coded separately from the significant coefficient and there are some refinement coefficients at the first scan or first several scan positions, the first zero run can start with a non-zero scanning position.

Several different approaches may be used to handle this situation. According to a first approach, a separate bin may be allocated in video encoder 22 to always handle the first iteration for a block. According to a second approach, video encoder 22 may use the scan index to retrieve the VLC parameters, but take advantage of the knowledge that the first iteration does not have EOB so that the symbol set does not have EOB inserted. According to a third approach, the coded block flag (CBF) in the first iteration can be treated as EOB by video encoder 22. If the CBF is 1, EOB of value 0 is sent for the first iteration. Otherwise, an EOB of value 1 is sent for the first iteration. Using this third approach, there may be little difference between the first iteration and other iterations.

Additional techniques to improve the performance of FGS coding may be provided. As explained above, it may be desirable to code the CBF before any significant coefficient is coded, because the CBF indicates whether there is any significant coefficient in the pertinent block. In some cases, the block may have some leading refinement coefficients. For example, if the very first coefficient is a refinement coefficient and the refinement coefficients are coded separately from the significant coefficients, the CBF for the block can be sent after the first refinement coefficient is sent. As a result, the CBF may not always be coded in the first coding cycle. If the CBF is not coded, implementation of the CAF with a CABAC entropy coder may create some issues. In CABAC entropy coding, the CBF is coded in the context based on the value of the CBFs of neighboring blocks. In addition, different contexts are used for coding the CBFs of different block types, such as luma 4×4 block, chroma AC block, chroma DC block, and the like. In a low-complexity FGS coding system, as described in this disclosure, all of the coded block flags in a cycle-aligned fragment may be coded by video encoder 22 in a single additional context if they are coded after some refinement coefficients in the same block.

As an example, it is assumed that there is one refinement coefficient in a block, and that the refinement coefficient is at the first scanning position. In addition, it is assumed that there are also some additional significant coefficients in the block. In this case, video encoder 22 may be configured to code the refinement coefficient first, followed by coding of the CBF of the block. The CBF can be coded in the newly defined context. Then, the significant coefficients in the block are coded.

Another issue that may arise in a CABAC-based implementation of CAFs is also related to context definition. CABAC entropy coding codes the significance flags and last significance flags using the context defined based on the scanning position. With the simplified implementation of CAFs, it may be desirable to maintain similar sets of context separately for each fragment within video encoder 22. Maintaining separate context sets may incur additional implementation cost. However, if more coding contexts are used for coding the same amount of coefficients as when there is not a cycle-aligned fragment, there may be an issue with context dilution which results in lower coding performance. In the FGS slice encoder of video encoder 22, the coding contexts for multiple significance flags can be grouped.

For example, if the start cycle scanning position is 3, and the vector length is 3 for a fragment, the original significance coding contexts are used for scanning positions 3, 4, and 5. Beyond scanning position 5, coding contexts for the significance flags can be grouped in various ways. One example is to set a threshold C>=6. If the scanning position is before or at C, a separate context may be used for coding the significance flag. All the significance flags corresponding to the scanning positions after C then may be coded in a single context. A similar method can be used for defining the additional coding context for coding the last significance coefficient flag. In another example, the scanning may be limited within that specified by the vector length, instead of the position of the next nonzero coefficients.

Set forth below in Table 1 is an example of syntax modifications that may be implemented to support CAFs in accordance with some aspects of this disclosure. The syntax modifications may be made relative to applicable syntax set forth in Joint Draft 6 (JD6) of the SVC extension to the H.264/MPEG-4 AVC standard, or syntax otherwise presented in the JVSM. For that particular FGS coding scheme, the FGS slice may also be referred to as PR (Progressive Refinement) slice.

In the various tables in this disclosure, all syntax elements may have the pertinent syntax and semantics indicated in the ITU-T H.264 standard, or the SVC extension, e.g., as embodied in the JVSM or JD6, to the extent such syntax elements are described in the H.264 standard, unless specified otherwise. In general, syntax elements and semantics not described in the H.264 standard or JD6 are described in this disclosure.

In various tables in this disclosure, the column marked "C" lists the categories of the syntax elements that may be present in the NAL unit, which may conform to categories in the H.264 standard. In addition, syntax elements with syntax category "All" may be present, as determined by the syntax and semantics of the raw bit sequence payload (RBSP) data structure contained in the FGS slice NAL unit.

The presence or absence of any syntax elements of a particular listed category is determined from the syntax and semantics of the associated RBSP data structure. The descriptor column specifies a descriptor, e.g., f(n), u(n), b(n), ue(v), se(v), me(v), ce(v), that may generally conform to the descriptors specified in the H.264 standard or JD6, unless otherwise specified in this disclosure.

TABLE 1

Syntax Modification to Support Cycle-Aligned Fragments

| | C | Descriptor |
|---|---|---|
| seq_parameter_set_rbsp( ) { | | |
|   profile_idc | 0 | u(8) |
|   ...... | | |
|   if( profile_idc = = 83 ) { | | |
|     seq_parameter_set_svc_extension( )/* specified in Annex G */ | | |
|   } | | |
|   ...... | | |
| seq_parameter_set_svc_extension( ) { | | |
|   ...... | | |
|   pr_info_present_flag[Notes : may be qualified by profile_idc once profiles are defined] | 2 | u(1) |
|   if( pr_info_present_flag ) { | | |
|     pr_cycle_aligned_fragment_flag | 2 | u(1) |
|     num_pr_vector_modes_minus1 | 2 | ue(v) |
|     for( i = 0; i <= num_pr_vector_modes_minus1; i ++ ){ | | |
|       pr_coding_mode[ i ] | 2 | u(1) |
|       if( pr_coding_mode[ i ] = = 0 ) { | | |
|         grouping_size_minus1[ i ] | 2 | ue(v) |
|       } else { | | |
|         NumPosVector[ i ] = 0 | | |
|         remVectorLen = 16 | | |
|         do { | | |
|           reverse_pr_vector_len_minus1[ i ][ NumPosVector[ i ]] = 0 | | |
|           if( remVectorLen > 1 ) | | |
|             reverse_pr_vector_len_minus1[ i ][ NumPosVector[ i ]] | 2 | u(v) |
|           remVectorLen − = | | |
|             reverse_pr_vector_len_minus1[ i ][ NumPosVector[ i ]] + 1 | | |
|           NumPosVector[ i ] ++ | | |
|         } while ( RemVectorLen > 0 ) | | |
|       } | | |
|     } | | |
|   } | | |
|   ...... | | |
| } | | |
| slice_header_in_scalable_extension( ) { | | |
|   first_mb_in_slice | 2 | ue(v) |
|   slice_type | 2 | ue(v) |
|   ...... | | |
|   if( slice_type = = PR && fragment_order = = 0) | | |
|     luma_chroma_sep_flag | | u(1) |
|     if( NumPrVectorModes > 1 ) | | |
|       pr_vector_mode_idx | 2 | te(v) |
|     if( luma_chroma_sep_flag == 0 ) { | | |
|       chromaStartCycle = 1 | | |
|       cycle_start_symbol | 2 | u(1) |
|       if( cycle_start_symbol = = 1 ) { | | |
|         cycle_start_symbol_ext | 2 | u(1) |
|         chromaStartCycle = 2 + cycle_start_symbol_ext | | |
|       } | | |

TABLE 1-continued

Syntax Modification to Support Cycle-Aligned Fragments seq_parameter_set_rbsp( ) {                                    C  Descriptor

}
......

Example semantics of the new or modified syntax elements presented in Table 1 will now be described. Syntax elements in the sequence parameter set, which is sent less frequently, are described as follows.

The syntax element pr_info_present_flag specifies the presence of syntax elements used in FGS slice decoding, such as PR slice decoding. When pr_info_present_flag is equal to 0, no further syntax elements used in FGS slice decoding are present in the sequence parameter set. When pr_info_present_flag is equal to 1, syntax elements that specify the usage of CAF and PR vector mode parameters are present in the sequence parameter set. When pr_info_present_flag is not present, it may be inferred to be equal to 0.

The syntax element pr_cycle_aligned_fragment_flag specifies whether block-based decoding using CAFs should be invoked for FGS slice decoding. When the value of pr_cycle_aligned_fragment_flag is equal to 1, block-based decoding using CAFs shall be invoked. When pr_cycle_aligned_fragment_flag is not present, it shall be inferred to be equal to 1.

The syntax element num_pr_vector_modes_minus1 specifies the size of the array of vector mode parameters present in the sequence parameter set. Vector mode parameters are derived from subsequent syntax elements and stored in the two-dimensional array ScanPosVectSet, where each one-dimensional array ScanPosVectSet[i] stores the parameters pertaining to the i-th vector mode, for i=0, 1, . . . num_pr_vector_modes_minus1.

The variable NumPrVectorModes can be derived as follows. If the syntax element num_pr_vector_modes_minus1 is present, NumPrVectorModes is set to be equal to (num_pr_vector_modes_minus1+1). Otherwise, NumPrVectorModes is equal to 1.

The syntax element pr_coding_mode[i] specifies which syntax element is used to derive the array ScanPosVectSet[i]. When pr_coding_mode[i] is equal to 0, the vector mode parameters in the array ScanPosVectSet[i] are derived using the syntax element grouping_size_minus1[i]. When pr_coding_mode[i] is equal to 1, the vector mode parameters in the array ScanPosVectSet[i] are derived using the array reverse_pr_vector_len_minus1[i][k], k=0, . . . , NumPosVector[i]−1. If num_pr_vector_modes_minus1 is not present, pr_coding_mode[0] is set to be equal to 0.

The syntax element grouping_size_minus1[i] specifies the number of scanning positions grouped within each vector, minus 1. If num_pr_vector_modes_minus1 is not present, grouping_size_minus1[0] is set to be equal to 15.

The syntax element reverse_pr_vector_len_minus1[i] [k] specifies the vector length between ScanPosVectSet[i][NumPosVector[i]−1−k] and ScanPosVectSet[i][NumPosVector[i]−k], minus 1. The syntax element reverse_pr_vector_len_minus1[i][k] shall be decoded as unsigned value using ceil (log(remVectorLen−1)) bits.

The array ScanPosVectSet can be derived as follows:

```
for( i = 0; i < NumPrVectorModes; i ++ ) {
    if( pr_coding_mode[ i ] == 0 ) {
        posVectLen = grouping_size_minus1[ i ] + 1
        NumPosVector[ i ] = 1 + 15 / posVectLen
        for( j = 0; j < NumPosVector[ i ]; j ++ )
            ScanPosVectSet[ i ][ j ] = j * posVectLen
        ScanPosVectSet[ i ][NumPosVector[ i ]] = 16
    }
    else {
        ScanPosVectSet[ i ][ NumPosVector[ i ]] = 16
        for( j = NumPosVector[ i ] − 1; j >= 0; j ++ )
            ScanPosVectSet[ i ][ j ] = ScanPosVectSet[ i ][j + 1 ] −
                ( reverse_pr_vector_len_minus1[ i ]
                [ NumPosVector[ i ] − 1 − j ] + 1
    }
```

Corresponding syntax elements in the slice header may be provided as follows.

The syntax element pr_vector_mode_idx specifies the index into the array ScanPosVectSet which stores vector mode parameters. The value of pr_vector_mode_idx shall be in the range of 0 and (NumPrVectorModes−1), inclusive. ScanPosVectSet [pr_vector_mode_idx] and NumPosVector [pr_vector_mode_idx] are used in deriving the following parameters for decoding the current progressive refinement slice:

```
NumPrCycles,
ScanPosVectLuma[ cycleIdx ], cycleIdx = 0, ..., NumPrCycles,
ScanPosVectLuma8x8[ cycleIdx ], cycleIdx = 0, ..., NumPrCycles,
ScanPosVectChromaDC[ cycleIdx ], cycleIdx = 0, ..., NumPrCycles,
ScanPosVectChromaAC[ cycleIdx ], cycleIdx = 0, ..., NumPrCycles.
```

These parameters may be derived as follows:

```
ScanPosVectLuma [ 0 ] = 0
ScanPosVectLuma8x8 [ 0 ] = 0
ScanPosVectChromaAC[ 0 ] = 1
ScanPosVectChromaDC[ 0 ] = 0
for( cycleIdx=1; cycleIdx <= NumPosVector[ pr_vector_mode_idx ]; cycleIdx ++ ) {
    ScanPosVectLuma[cycleIdx]=ScanPosVectSet[pr_vector_mode_idx][cycleIdx]
    ScanPosVectLuma8x8 [ cycleIdx ]=ScanPosVectLuma[ cycleIdx ] * 4
    ScanPosVectChromaDC[ cycleIdx ]=ScanPosVectChromaDC[ cycleIdx − 1 ]
    ScanPosVectChromaAC[ cycleIdx ] = ScanPosVectChromaAC[ cycleIdx − 1 ]
    // find the start scanning position for chroma DC and chroma AC
    if( luma_chroma_sep_flag == 0 ) {
        for( sIdx = ScanPosVectLuma[ cycleIdx − 1 ]; sIdx < ScanPosVectLuma[
cycleIdx ]; sIdx ++ ) {
```

-continued

```
        if( ( ScanPosVectChromaDC[ cycleIdx ] < 4 ) && ( ( sIdx = = 0 ) ||
                ( ( sIdx >= ChromaStartCycle ) && ( ( scanIdx −
ChromaStartCycle) % 2 = = 0 ) ) ) )
                ScanPosVectChromaDC[ cycleIdx ] ++
            if( (ScanPosVectChromaAC[ cycleIdx ] < 16 ) && ( ( sIdx > 0 ) && (
( sIdx = = ChromaStartCycle ) ||
                ( sIdx >= ChromaStartCycle && ( ( sIdx − ChromaStartCycle)
% 3 = = 1 ) ) ) ) )
                ScanPosVectChromaAC[ cycleIdx ] ++
        }
        }
    }
    NumPrCycles = NumPosVector[ pr_vector_mode_idx ] + ( (
luma_chroma_sep_flag = = 1 ) ? 1 : 0 );
    ScanPosVectLuma [ NumPrCycles ] = 16;
    ScanPosVectLuma8x8 [ NumPrCycles ] = 64;
    ScanPosVectChromaDC[ NumPrCycles ] = 4
    ScanPosVectChromaAC[ NumPrCycles ] = 16;
```

The syntax element ScanPosVectLuma[i] gives the start scanning position in the coding cycle of index i for 4×4 luma blocks. ScanPosVectLuma8×8[i] gives the start scanning position in the coding cycle of index i for 8×8 luma blocks. ScanPosVectChromaDC[i] gives the start scanning position in the coding cycle of index i for chroma DC blocks. ScanPosVectChromaAC[i] gives the start scanning position in the coding cycle of index i for chroma AC blocks.

The signaling of a different vector mode configuration can also be in the slice header as illustrated below in Table 2. Hence, in this modified vector mode, vector lengths can be specified in a slice header rather than the sequence parameter set. This approach may involve the use of an override flag to generate a new set of scanning vectors. The vector lengths can also be signaled using other approaches with different trade-offs between complexity and amount of overhead. Accordingly, the disclosure contemplates any of a variety of techniques for signaling a vector mode, wherein information is encoded to signal a vector mode, including the example technique of signaling in a slice header as illustrated in Table 2.

TABLE 2

SIGNALING OF DIFFERENT VECTOR MODE CONFIGURATIONS

| slice_header_in_scalable_extension( ) { | C | Descriptor |
|---|---|---|
| first_mb_in_slice | 2 | ue(v) |
| slice_type | 2 | ue(v) |
| ...... | | |
| if( slice_type = = PR && fragment order = = 0 ) { | | |
| num_mbs_in_slice_minus1 | 2 | ue(v) |
| luma_chroma_sep_flag | 2 | u(1) |
| if( luma_chroma_sep_flag == 0 ) { | 2 | u(1) |
| chromaStartCycle = 1 | | |
| cycle_start_symbol | 2 | u(1) |
| if( cycle_start_symbol = = 1 ) { | | |
| cycle_start_symbol_ext | 2 | u(1) |
| chromaStartCycle = 2 + cycle_start_symbol_ext | | |
| } | | |
| } | | |
| cycle_aligned_fragment_flag | 2 | u(1) |
| vector_mode_override | 2 | u(1) |
| if( vector_mode_override ) { | | |
| numPosVector = 0 | | |
| RemVectorLen = 16 | | |
| do { | | |
| rev_fgs_vector_len_minus1[ numPosVector ] = 0 | | |
| if( RemVectorLen > 1 ) | | |
| reverse_fgs_vector_len_minus1 | 2 | u(v) |
| [ numPosVector ] | | |

TABLE 2-continued

SIGNALING OF DIFFERENT VECTOR MODE CONFIGURATIONS

| slice_header_in_scalable_extension( ) { | C | Descriptor |
|---|---|---|
| RemVectorLen − = | | |
| rev_fgs_vector_len_minus1[ numPosVector ] + | | |
| 1 | | |
| numPosVector ++ | | |
| } while ( RemVectorLen > 0 ) | | |
| } | | |
| ...... | | |
| } | | |

Definition of the macroblock header in the FGS slice will now be described. In JSVM, the bitstream structure of a progressive slice was designed in a way so that the syntax elements that do not directly contribute to the improvement of the quality of reconstructed video are sent as late as possible. If the bitstream is partially truncated, the reconstructed video can have maximal quality. Table 3 below provides a segment of pseudo code that provides the basic bitstream structure of an fgs slice. Table 4 below illustrates example syntax elements for definition of the macroblock header in an fgs slice.

TABLE 3

FGS SLICE BITSTREAM STRUCTURE

```
for ( cycles = 0; cycle < 16; cycle ++ )    {
    for ( mb_idx = first_mb_in_slice;
    mb_idx <= last_mb_in_slice; mb_idx ++ ){
        if ( need_to_send_motion_refinement )
            send_mb_fgs_motion_refinement( )
        for( blk8x8 = 0; blk8x8 < 4; blk8x8 ++ ) {
            if( luma_sub_mb_cbp_is_not_sent ) {
                send_luma_sub_mb_cbp( )
            if( is_first_nonzero_sub_mb_cbp ) {
                if(delta_qp_is_not_sent && base_mb_cbp == 0 )
                    delta_qp( )
                if( ! transform_8x8_specified_in_base_layer )
                    transform_8x8_flag( )
            }
        }
        luma_coefficients_in_the_cycle( )
        if( allow_chroma_dc ) {
            if( chroma_dc_cbp_is_not_sent ) {
                chroma_dc_cbp( )
            if( delta_qp_is_not_sent && chroma_dc_cbp != 0 ) {
                if( base_mb_cbp == 0 )
                    delta_qp( )
            }
        }
```

TABLE 3-continued

FGS SLICE BITSTREAM STRUCTURE

```
       chroma_dc_coefficients_in_the_cycle( )
     }
     if( allow_chroma_dc ) {
       if( chroma_ac_cbp_is_not_sent ) {
         chroma_ac_cbp( )
       if( delta_qp_is_not_sent && chroma_ac_cbp != 0 ) {
         if( base_mb_cbp == 0 )
           delta_qp( )
       }
       chroma_ac_coefficients_in_the_cycle( )
     }
   }
 }
```

As an example, the chroma CBP may be sent immediately before chroma coefficients, but after the luma coefficients of the first coding cycle in the same macroblock, while in the AVC base layer, chroma CBP can be sent in the macroblock header. Another example is the transmission of delta QP. If a macroblock in the enhancement layer does not have any nonzero luma coefficients and nonzero chroma DC coefficients, but it has some nonzero chroma AC coefficients, and the macroblock CBP in the base layer is zero, the delta QP may be sent immediately before the chroma AC coefficients are encoded. This approach is very different from the way in which these syntax elements are typically sent in the AVC base layer.

The section of pseudo code presented above in Table 3 provides the basic bitstream structure of an FGS slice. However, by performing a simple analysis of the actual coding order, the delaying of transmitting these syntax elements actually may not provide much benefit.

Two chroma related flags, allow_chroma_dc and allow_chroma_ac, may be used in video encoder 20 for controlling the rate of transmitting the chroma coefficients with respect to the rate of the transmitting luma coefficients. In coding cycle 0, these two flags may always be set to 1, so that all of the syntax elements mentioned above will be transmitted in the first cycle. The bits upon sending these syntax elements will be delayed, but may still be transmitted within the first coding cycle of a macroblock. This minor shuffle of the bits should not have much impact on the coding performance if the bitstream is truncated.

The MB header for an FGS slice may be defined as indicated in Table 4 below. Notably, this particular example of MB header may have a same structure similar to that of a coarse-grain SNR scalability (CGS) layer.

TABLE 4

DEFINITION OF MACROBLOCK HEADER IN FGS SLICE

```
for ( cycles = 0; cycle < 16; cycle ++ ) {
  for ( mb_idx = first_mb_in_slice;
  mb_idx <= last_mb_in_slice; mb_idx ++ ) {
    if ( cycle = 0 ) {
      // send MB header separately from the coefficients
      if ( need_to_send_motion_refinement )
        send_mb_fgs_motion_refinement( )
      mb_luma_cbp( )
      chrom_cbp( )
      if( mb_luma_cbp !=
      0 && ! transform_8x8_specified_in_base_layer )
        transform_8x8_flag( )
      if( mb_luma_cbp != 0 && base_mb_cbp != 0 )
        mb_delta_qp( )
    }
    luma_coefficients_in_the_cycle( )
    if( allow_chroma_dc ) {
      chroma_dc_coefficients_in_the_cycle( )
    }
    if( allow_chroma_dc ) {
      chroma_ac_coefficients_in_the_cycle( )
    }
  }
}
```

With CAFs and associated coding techniques, as described in this disclosure, the decoding process for an FGS slice can be significantly simplified, and may be similar to the decoding process for a discrete enhancement layer. The CAFs and associated techniques can also significantly simplify the specification of the syntax of the FGS slice. Set forth below in Table 5 is an example of the decoding flow, e.g., within video decoder 22, when a CAF and associated macroblock header, as described in this disclosure, are used. Some functions that are not listed may be similar to the functions used in SVC JD, except that improvements or modifications explained above in this disclosure may be used. CAFs can also work with different FGS coding schemes.

The switching of input data, i.e., data within a fragment, may be handled inside the residual_block decoding function. The cost of switching of input buffers is much less than the cost associated with a frame-based decoding process.

TABLE 5

FGS SLICE DATA IN SCALABLE EXTENSION SYNTAX

| progressive_refinement_slice_data_in_block_order( ) { | C | Descriptor |
|---|---|---|
| progressive_refinement_data_supplemental_info_in_scalable_extension( ) | | |
| while( CurrMbAddr <= lastMbAddr ) { | | |
|   mb_header_in_progressive_refinement_slices( ) | | |
|   for( i8x8 = 0; i8x8 < 4; i8x8++ ) { | | |
|     if( ! transform_size_8x8_flag || ! entropy_coding_mode_flag ) { | | |
|       for( i4x4 = 0; i4x4 < 4; i4x4++ ) { | | |
|         for( i = 0; i < 16; i++ ) { | | |
|           baseCoeffs[ i ] = ( ! TranformSize8x8Flag ) ? | | |
|             base_luma_level( CurrMbAddr, i8x8, i4x4, i ) : | | |
|             base_luma_level8x8 ( CurrMbAddr, i8x8, i * 4 + i4x4 ) | | |
|       } | | |
|       blk4x4 = i8x8 * 4 + i4x4 | | |
|       coded_block_flag_luma[ blk4x4 ] | 3 \| 4 | ge(v) \| ae(v) |
|       pr_slice_residual_block( LumaLevel[ blk4x4 ], baseCoeffs, | 3 \| 4 | |
|         0, 16, ScanVectPosLuma, coded_block_flag_luma[ blk4x4 ], 0) | | |
|       if( ! entropy_coding_mode_flag && transform_size_8x8_flag ) | | |
|         for( i = 0; i < 16; i++ ) | | |

TABLE 5-continued

FGS SLICE DATA IN SCALABLE EXTENSION SYNTAX

| progressive_refinement_slice_data_in_block_order( ) { | C | Descriptor |
|---|---|---|
|                 LumaLevel8x8[ i8x8 ][ 4 * i + i4x4 ] = <br>                    LumaLevel[ blk4x4 ][ i ] <br>        } <br>    } <br>    else { <br>      for( i = 0; i < 64; i++ ) { <br>        baseCoeffs[ i ] = base_luma_level8x8 ( CurrMbAddr, i8x8, i ) <br>      pr_residual_block( LumaLevel8x8[ i8x8 ], baseCoeffs, <br>        0, 64, ScanVectPosLuma8x8, 1, 0 ) <br>      } <br>    } <br>  if( chroma_format_idc != 0 ) { <br>    NumC8x8 = 4 / ( SubWidthC * SubHeightC ) <br>    for( iCbCr = 0; iCbCr < 2; iCbCr++ ) { <br>      for( i = 0; i < 4 * NumC8x8; i++ ) <br>        baseCoeffs[ i ] = base_chromaDC_level( CurrMbAddr, iCbCr, i ) <br>      pr_slice_residual_block( ChromaDCLevel[ iCbCr ], <br>        baseCoeffs, 0, 4 * NumC8x8, ScanVectPosChromaDc, 0, 1 ) <br>    } | | |
| | 3 \| 4 | |
| | 3 \| 4 | |
|     for( iCbCr = 0; iCbCr < 2; iCbCr++ ) { <br>      for( i8x8 = 0; i8x8 < NumC8x8; i8x8++ ) { <br>        for( i4x4 = 0; i4x4 < 4; i4x4++ ) { <br>          b4x4 = i8x8 * 4 + i4x4 <br>          for( i = 0; i < 4 * NumC8x8; i++ ) { <br>            baseCoeffs[ i ] = base_chromaAC_level <br>              ( CurrMbAddr, iCbCr, i8x8, i4x4, i ) <br>            pr_slice_residual_block( ChromaACLevel[ iCbCr ][ b8x8 ], <br>              baseCoeffs, 1, 16, ScanVectPosChromaAC, 0, 1 ) <br>          } <br>        } <br>    } <br>  } <br>} | 3 \| 4 | |

Table 6 below illustrates example syntax for FGS slice residual block data in the scalable extension.

TABLE 6

FGS SLICE RESIDUAL BLOCK DATA IN SCALABLE EXTENSION SYNTAX

| pr_slice_residual_block( coeffLevel, baseCoeffs, startIdx, stopIdx, scanVectPos, codedBlockFlag, isChroma ) { | C | Descriptor |
|---|---|---|
|   if( !entropy_coding_mode_flag ) <br>    pr_slice_sig_coeff_and_run = pr_slice_sig_coeff_and_run_cavlc <br>  else <br>    pr_slice_sig_coeff_and_run = pr_slice_sig_coeff_and_run_cabac <br>  endOfBlock = codedBlockFlag == 0 <br>  codedBlockFlagNotCoded = ( isChroma && codedBlockFlag = = 1 ) ? 1 : 0 <br>  runLen = 0 <br>  firstCoeff = 1 <br>  for( fragIdx = 0, scanIdx = startIdx; scanIdx < stopIdx; scanIdx ++ ) { <br>    while( scanIdx >= scanVectPos[ fragIdx + 1 ] ) { <br>      fragIdx ++ <br>      Switch_CAF( ) <br>    } <br>    if( baseSigCoeffMap[ scanIdx ] ) { <br>      bLSign = ( baseCoeffs[ scanIdx ] < 0 ? 1 : 0 ) <br>      coeff_refinement( bLSign, coeffLevel[ scanIdx ] ) <br>    } <br>    if( codedBlockFlagNotCoded ) { <br>      codedBlockFlagNotCoded = 0 <br>      if( startIdx == 1 ) { /* chroma AC */ | | |
|         coded_block_flag_chromaAC <br>        endOfBlock = ( coded_block_flag_chromaAC = = 0 ) ? 1 : 0 <br>      } <br>      else { | 3 \| 4 | u(v) \| ae(v) |
|         coded_block_flag_chromaDC <br>        endOfBlock = ( coded_block_flag_chromaDC = = 0 ) ? 1 : 0 <br>      } <br>    } <br>    if( runLen > 0 ) <br>      runLen -- | 3 \| 4 | u(v) \| ae(v) |

TABLE 6-continued

FGS SLICE RESIDUAL BLOCK DATA IN SCALABLE EXTENSION SYNTAX

| pr_slice_residual_block( coeffLevel, baseCoeffs, startIdx, stopIdx, scanVectPos, codedBlockFlag, isChroma ) { | C | Descriptor |
|---|---|---|
|     else if( ! endOfBlock ){<br>        pr_slice_sig_coeff_and_run( coeffLevel, baseCoeffs, firstCoeff,<br>            scanIdx, startIdx, lastIdx, trmCoeff, numCoeffs, isChroma )<br>        runLen = ( numCoeffs > 0 ) ? numCoeffs − 1 : 0;<br>        endOfBlock = ( numCoeffs == 0 ) > 1 : 0<br>        firstCoeff = 0<br>    }<br>    if( runLen = =0 && ! endOfBlock )<br>        coeffLevel[ scanIdx ] = trmCoeff<br>  }<br>} | | |

Table 7 below illustrates example syntax for significant coefficient and run in FGS slice data CABAC syntax.

Table 8 below illustrates example syntax for significant coefficient and run in FGS slice data CAVLC syntax.

TABLE 8

SIGNIFICANT COEFFICIENT AND RUN IN FGS SLICE DATA CAVLC SYNTAX

| pr_slice_sig_coeff_and_run_cavlc( coeffLevel, baseCoeffs, firstCoeff, scanIdx, startIdx, lastIdx, trmCoef, numCoeffs, isChroma ) { | C | Descriptor |
|---|---|---|
|   numRemain = 1<br>  for( i = scanIdx + 1; i < lastIdx; i ++ )<br>    numRemain += ( baseCoeffs[ i ] != 0 ) 0 : 1<br>  sigVlcSelector = sig_vlc_selector[ scanIdx ]<br>  eobShift = isChroma ?<br>    eob_shift_chroma[ scanIdx ] : eob_shift_luma[scanIdx ]<br>  significant_coefficient_cavlc ( firstCoeff, numRemain, sigVLCSelector,<br>    eobShift, numCoeffs, trmCoef )<br>  if( numCoeffs = = 0 ) {<br>    residual_mag = ( trmCoef <= 0 ) ? 1 : 0<br>  else {<br>    eob = 1<br>    for( i = scanIdx + numCoeffs + 1; i < stopIdx; i++ )<br>      eob &= baseCoeffs[ i ] != 0<br>    if( eob ) {<br>      residual_mag = 1<br>      coeff_sig_vlc_symbol<br>      trmCoef = coeff_sig_vlc_symbol<br>    }<br>  if( residual_mag ) { /* magnitudes greater than 1 in CAVLC */<br>    for( i = startIdx; i < stopIdx; i++ )<br>      sigCoefMap[ i ] =<br>        ( coeffLevel[ i ] != 0 && baseCoeffs[ i ] = = 0 ) ? 1 : 0<br>    significant_coefficient_magnitude_cavlc( coeffLevel,<br>      SigCoefMap, startIdx, stopIdx, trmCoef )<br>  }<br>    if( residual_mag ) { /* magnitudes greater than 1 in CAVLC */<br>      for( i = 0; i < 4; i++ )<br>        sigCoefMap[ i ] =<br>          sig_chromaDC_coef( CurrMbAddr, iCbCr, i ) ? 1 : 0<br>      significant_coefficient_magnitude_cavlc( ChromaDCLevel[iCbCr],<br>        SigCoefMap, 0, 4, trmCoef )<br>    } | | |
|       coeff_sig_vlc_symbol | 3 \| 4 | ge(v) |

TABLE 7

SIGNIFICANT COEFFICIENT AND RUN IN FGS SLICE DATA CABAC SYNTAX

| pr_slice_sig_coeff_and_run_cabac( coeffLevel, baseCoeffs, firstCoeff, scanIdx, startIdx, lastIdx, trmCoeff, numCoeffs, isChroma ) { | C | Descriptor |
|---|---|---|
|   significant_coefficient_cabac( firstCoeff,<br>    numCoeffs, trmCoeff )<br>} | | |

Any device described in this disclosure may represent various types of devices, such as a wireless phone, a cellular phone, a laptop computer, a wireless multimedia device, a wireless communication personal computer (PC) card, a personal digital assistant (PDA), an external or internal modem, a gaming device, or any multimedia device that communicates through a wireless or wired channel. Such a device may have various names, such as access terminal (AT), access unit, subscriber unit, mobile station, mobile device, mobile unit, mobile phone, mobile, remote station, remote terminal, remote unit, user device, user equipment, handheld device, or the like.

The techniques described herein may be implemented in hardware, software, firmware, or any combination thereof If implemented in software, the techniques may be realized at least in part by one or more stored or transmitted instructions or code on a computer-readable medium of a computer program product that cause a processor to perform such techniques. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise a data storage medium such as RAM, synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other computer-readable data storage medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various aspects of the disclosure have been described. These and other aspects are within the scope of the following claims.

The invention claimed is:

1. A video coding method comprising:
    configuring at least one processor to perform the functions of:
    encoding fine granularity scalability (FGS) video data blocks in cycles; and
    encapsulating the cycles in a plurality of fragments such that a start of each of the fragments substantially coincides with a start of one of the cycles.

2. The method of claim 1, wherein encapsulating comprises encapsulating the cycles in a plurality of fragments such that a start of a payload of each of the fragments substantially coincides with a start of one of the cycles.

3. The method of claim 1, wherein the FGS video data blocks comprise blocks of transform coefficients, and encoding the FGS video data blocks includes encoding the coefficients associated with the FGS video data blocks in the cycles.

4. The method of claim 1, wherein the FGS video data blocks comprise blocks of transform coefficients, and wherein at least some of the cycles span transform coefficients associated with a plurality of the FGS video data blocks.

5. The method of claim 1, wherein the FGS video data blocks correspond to a progressive refinement (PR) slice of video data.

6. The method of claim 1, further comprising:
    applying entropy coding to the fragments; and
    resetting coding contexts associated with the entropy coding for each of the fragments.

7. The method of claim 6, wherein resetting the entropy coding comprises:
    flushing an entropy coder used to apply the entropy coding after each of the fragments is entropy coded; and
    resetting the coding contexts used by the entropy coder after each of the fragments is entropy coded.

8. The method of claim 1, further comprising controlling one or more of the cycles with a vector mode to scan to a predefined scan position within each of the blocks before moving to another one of the blocks.

9. The method of claim 8, further comprising encoding information to signal the vector mode.

10. The method of claim 1, wherein each of the cycles represents at least a portion of a zigzag order scan of one or more of the blocks.

11. A video encoder comprising:
    a cycle-based coding module that is configured to instruct a processor to encode fine granularity scalability (FGS) video data blocks in cycles; and
    a fragmentation module that is configured to instruct the processor to encapsulate the cycles in a plurality of fragments such that a start of each of the fragments substantially coincides with a start of one of the cycles.

12. The encoder of claim 11, wherein the fragmentation module encapsulates the cycles in a plurality of fragments such that a start of a payload of each of the fragments substantially coincides with a start of one of the cycles.

13. The video encoder of claim 11, wherein the FGS video data blocks comprise blocks of transform coefficients, and the cycle-based encoding module encodes the coefficients associated with the FGS video data blocks in the cycles.

14. The video encoder of claim 11, wherein the FGS video data blocks comprise blocks of transform coefficients, wherein at least some of the cycles span transform coefficients associated with a plurality of the FGS video data blocks.

15. The video encoder of claim 11, wherein the FGS video data blocks correspond to a progressive refinement (PR) slice of video data.

16. The video encoder of claim 11, further comprising an entropy coder module that applies entropy coding to the fragments, and resets coding contexts associated with the entropy coding for each of the fragments.

17. The video encoder of claim 16, wherein, to reset the entropy coding, the entropy coder module flushes an entropy coder used to apply the entropy coding after each of the fragments is entropy coded, and resets the coding contexts used by the entropy coder after each of the fragments is entropy coded.

18. The video encoder of claim 11, wherein the cycle-based coding module control each of the cycles with a vector mode to scan to a predefined scan position within each of the blocks before moving to another one of the blocks.

19. The video encoder of claim 18, wherein the coding module encodes information to signal the vector mode.

20. The video encoder of claim 11, wherein each of the cycles represents at least a portion of a zigzag order scan of one or more of the blocks.

21. A video encoder comprising:
means for encoding fine granularity scalability (FGS) video data blocks in cycles; and
means for encapsulating the cycles in a plurality of fragments such that a start of each of the fragments substantially coincides with a start of one of the cycles.

22. The video encoder of claim 21, wherein the encapsulating means comprises means for encapsulating the cycles in a plurality of fragments such that a start of a payload of each of the fragments substantially coincides with a start of one of the cycles.

23. The video encoder of claim 21, wherein the FGS video data blocks comprise blocks of transform coefficients, and the means for encoding the FGS video data blocks includes means for encoding the coefficients associated with the FGS video data blocks in the cycles.

24. The video encoder of claim 21, wherein the FGS video data blocks comprise blocks of transform coefficients, and wherein at least some of the cycles span transform coefficients associated with a plurality of the FGS video data blocks.

25. The video encoder of claim 21, wherein the FGS video data blocks correspond to a progressive refinement (PR) slice of video data.

26. The video encoder of claim 21, further comprising:
means for applying entropy coding to the fragments; and
means for resetting coding contexts associated with the entropy coding for each of the fragments.

27. The video encoder of claim 26, wherein the means for resetting the entropy coding comprises:
means for flushing an entropy coder used to apply the entropy coding after each of the fragments is entropy coded; and
means for resetting the coding contexts used by the entropy coder after each of the fragments is entropy coded.

28. The video encoder of claim 21, further comprising means for controlling one or more of the cycles with a vector mode to scan to a predefined scan position within each of the blocks before moving to another one of the blocks.

29. The video encoder of claim 28, further comprising means for encoding information to signal the vector mode.

30. The video encoder of claim 21, wherein each of the cycles represents at least a portion of a zigzag order scan of one or more of the blocks.

31. A non-transitory computer-readable medium comprising instructions that when executed cause a processor to:
encode fine granularity scalability (FGS) video data blocks in cycles; and
encapsulate the cycles in a plurality of fragments such that a start of each of the fragments substantially coincides with a start of one of the cycles.

32. The computer-readable medium of claim 31, wherein the instructions cause the processor to encapsulate the cycles in a plurality of fragments such that a start of a payload of each of the fragments substantially coincides with a start of one of the cycles.

33. The computer-readable medium of claim 31, wherein the FGS video data blocks comprise blocks of transform coefficients, and wherein the instructions cause the processor to encode the coefficients associated with the FGS video data blocks in the cycles.

34. The computer-readable medium of claim 31, wherein the FGS video data blocks comprise blocks of transform coefficients, and wherein at least some of the cycles span transform coefficients associated with a plurality of the FGS video data blocks.

35. The computer-readable medium of claim 31, wherein the FGS video data blocks correspond to a progressive refinement (PR) slice of video data.

36. The computer-readable medium of claim 31, wherein the instructions cause the processor to: apply entropy coding to the fragments; and reset coding contexts associated with the entropy coding for each of the fragments.

37. The computer-readable medium of claim 36, wherein the instructions cause the processor to: flush an entropy coder used to apply the entropy coding after each of the fragments is entropy coded; and reset the coding contexts used by the entropy coder after each of the fragments is entropy coded.

38. The computer-readable medium of claim 31, wherein the instructions cause the processor to control one or more of the cycles with a vector mode to scan to a predefined scan position within each of the blocks before moving to another one of the blocks.

39. The computer-readable medium of claim 38, wherein the instructions cause the processor to encode information to signal the vector mode.

40. The computer-readable medium of claim 31, wherein each of the cycles represents at least a portion of a zigzag order scan of one or more of the blocks.

41. A video decoding method comprising:
configuring at least one processor to perform the functions of:
receiving fragments including coding cycles that encode fine granularity scalability (FGS) video data blocks; and
decoding at least portions of at least some of the fragments simultaneously, wherein a start of each of the fragments substantially coincides with a start of one of the cycles.

42. The method of claim 41, wherein a start of a payload of each of the fragments substantially coincides with a start of one of the cycles.

43. The method of claim 41, wherein the cycles encode transform coefficients associated with the FGS video data blocks.

44. The method of claim 41, wherein at least some of the cycles span transform coefficients associated with a plurality of the FGS video data blocks.

45. The method of claim 41, wherein the FGS video data blocks correspond to a progressive refinement (PR) slice of video data.

46. The method of claim 41, wherein coding contexts associated with entropy coding for each of the fragments are reset after each of the fragments is entropy coded.

47. The method of claim 41, wherein each of the cycles represents at least a portion of a zigzag order scan of one or more of the blocks.

48. A video decoder comprising a cycle-based decoding module that is configured to instruct a processor to receive fragments including coding cycles that encode fine granularity scalability (FGS) video data blocks, and to decode at least portions of at least some of the fragments simultaneously, wherein a start of each of the fragments substantially coincides with a start of one of the cycles.

49. The decoder of claim 48, wherein a start of a payload of each of the fragments substantially coincides with a start of one of the cycles.

50. The video decoder of claim 48, wherein the cycles encode transform coefficients associated with the FGS video data blocks.

51. The video decoder of claim 48, wherein at least some of the cycles span encoding coefficients associated with a plurality of the FGS video data blocks.

52. The video decoder of claim 48, wherein the FGS video data blocks correspond to a progressive refinement (PR) slice of video data.

53. The video decoder of claim 48, wherein coding contexts associated with entropy coding for each of the fragments are reset after each of the fragments is entropy coded.

54. The video decoder of claim 48, wherein each of the cycles represents at least a portion of a zigzag order scan of one or more of the blocks.

55. A video decoder comprising:
   means for receiving fragments including coding cycles that encode fine granularity scalability (FGS) video data blocks; and
   means for decoding at least portions of at least some of the fragments simultaneously, wherein a start of each of the fragments substantially coincides with a start of one of the cycles.

56. The video decoder of claim 55, wherein a start of a payload of each of the fragments substantially coincides with a start of one of the cycles.

57. The video decoder of claim 55, wherein the cycles encode transform coefficients associated with the FGS video data blocks.

58. The video decoder of claim 55, wherein at least some of the cycles span transform coefficients associated with a plurality of the FGS video data blocks.

59. The video decoder of claim 55, wherein the FGS video data blocks correspond to a progressive refinement (PR) slice of video data.

60. The video decoder of claim 55, wherein coding contexts associated with entropy coding for each of the fragments are reset after each of the fragments is entropy coded.

61. The video decoder of claim 55, wherein each of the cycles represents at least a portion of a zigzag order scan of one or more of the blocks.

62. A non-transitory computer-readable medium comprising instructions to cause a processor to:
   receive fragments including coding cycles that encode fine granularity scalability (FGS) video data blocks; and
   decode at least portions of at least some of the fragments simultaneously, wherein a start of each of the fragments substantially coincides with a start of one of the cycles.

63. The computer-readable medium of claim 62, wherein a start of a payload of each of the fragments substantially coincides with a start of one of the cycles.

64. The computer-readable medium of claim 62, wherein the cycles encode transform coefficients associated with the FGS video data blocks.

65. The computer-readable medium of claim 62, wherein at least some of the cycles span transform coefficients associated with a plurality of the FGS video data blocks.

66. The computer-readable medium of claim 62, wherein the FGS video data blocks correspond to a progressive refinement (PR) slice of video data.

67. The computer-readable medium of claim 62, wherein coding contexts associated with entropy coding for each of the fragments are reset after each of the fragments is entropy coded.

68. The computer-readable medium of claim 62, wherein each of the cycles represents at least a portion of a zigzag order scan of one or more of the blocks.

* * * * *